US012809101B2

(12) United States Patent
Yu et al.

(10) Patent No.: US 12,809,101 B2
(45) Date of Patent: Nov. 24, 2026

(54) OPTICAL COUPLING STRUCTURE FOR SEMICONDUCTOR DEVICE

(71) Applicant: Taiwan Semiconductor Manufacturing Co., Ltd., Hsinchu (TW)

(72) Inventors: Chen-Hua Yu, Hsinchu (TW); Hsing-Kuo Hsia, Jhubei City (TW); Chih-Wei Tseng, Hsinchu (TW); Jiun Yi Wu, Zhongli City (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 409 days.

(21) Appl. No.: 18/448,686

(22) Filed: Aug. 11, 2023

(65) Prior Publication Data

US 2024/0369783 A1 Nov. 7, 2024

Related U.S. Application Data

(60) Provisional application No. 63/499,961, filed on May 3, 2023.

(51) Int. Cl.
*G02B 6/42* (2006.01)

(52) U.S. Cl.
CPC ......... *G02B 6/4214* (2013.01); *G02B 6/4239* (2013.01); *G02B 6/4283* (2013.01); *G02B 6/4291* (2013.01)

(58) Field of Classification Search
CPC .. G02B 6/4214; G02B 6/4239; G02B 6/4283; G02B 6/4291
See application file for complete search history.

(56) References Cited

U.S. PATENT DOCUMENTS

| | | | | |
|---|---|---|---|---|
| 8,993,380 | B2 | 3/2015 | Hou et al. | |
| 9,281,254 | B2 | 3/2016 | Yu et al. | |
| 9,299,649 | B2 | 3/2016 | Chiu et al. | |
| 9,372,206 | B2 | 6/2016 | Wu et al. | |
| 9,425,126 | B2 | 8/2016 | Kuo et al. | |
| 9,443,783 | B2 | 9/2016 | Lin et al. | |
| 9,461,018 | B1 | 10/2016 | Tsai et al. | |
| 9,496,189 | B2 | 11/2016 | Yu et al. | |
| 9,666,502 | B2 | 5/2017 | Chen et al. | |
| 9,735,131 | B2 | 8/2017 | Su et al. | |
| 2012/0199926 | A1 | 8/2012 | Oganesian et al. | |
| 2015/0037044 | A1* | 2/2015 | Peterson | G02B 6/4292 398/135 |
| 2019/0115995 | A1* | 4/2019 | Sahni | G02B 6/272 |

(Continued)

FOREIGN PATENT DOCUMENTS

| | | | |
|---|---|---|---|
| CN | 114660727 | A | 6/2022 |
| KR | 20210110132 | A | 9/2021 |

(Continued)

*Primary Examiner* — Uyen Chau N Le
*Assistant Examiner* — Hoang Q Tran
(74) *Attorney, Agent, or Firm* — Slater Matsil, LLP

(57) ABSTRACT

A package includes a routing structure including a first waveguide and a photonic device; an electronic die bonded to the routing structure, wherein the electronic die is electrically connected to the photonic device; and an optical coupling structure bonded to the routing structure adjacent the electronic die, wherein the optical coupling structure includes a first lens in a first side of a substrate.

20 Claims, 33 Drawing Sheets

(56) References Cited

U.S. PATENT DOCUMENTS

| | | | | |
|---|---|---|---|---|
| 2019/0162901 | A1* | 5/2019 | Yu | G02B 6/12002 |
| 2020/0124798 | A1* | 4/2020 | Chen | G02B 6/4214 |
| 2020/0166720 | A1 | 5/2020 | Charles et al. | |
| 2021/0088723 | A1* | 3/2021 | Yu | G02B 6/1225 |
| 2021/0096310 | A1* | 4/2021 | Chang | G02B 6/4274 |
| 2021/0271020 | A1 | 9/2021 | Islam et al. | |
| 2021/0302654 | A1 | 9/2021 | Chen et al. | |
| 2022/0196931 | A1 | 6/2022 | Li et al. | |
| 2022/0334310 | A1 | 10/2022 | Yu et al. | |
| 2022/0382003 | A1* | 12/2022 | Yu | G02B 6/12002 |
| 2023/0012157 | A1 | 1/2023 | Yu et al. | |

FOREIGN PATENT DOCUMENTS

| | | | |
|---|---|---|---|
| KR | 20210122045 | A | 10/2021 |
| KR | 20230007929 | A | 1/2023 |
| TW | 202133353 | A | 9/2021 |
| TW | 202242463 | A | 11/2022 |
| TW | 202318049 | A | 5/2023 |

* cited by examiner

310

OPTICAL COUPLING STRUCTURE FOR SEMICONDUCTOR DEVICE

PRIORITY CLAIM AND CROSS-REFERENCE

This application claims the benefits of U.S. Provisional Application No. 63/499,961, filed on May 3, 2023, which application is hereby incorporated herein by reference in its entirety.

BACKGROUND

Electrical signaling and processing are one technique for signal transmission and processing. High bandwidth networking and high performance computing have become more popular and widely used in advanced package application, especially for servers, A.I. (Artificial Intelligence), supercomputing, and related products. However, many existing solutions using copper interconnects cannot meet low insertion loss requirements, low latency requirements, and low power consumption requirements while providing increased bandwidth and data rate.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
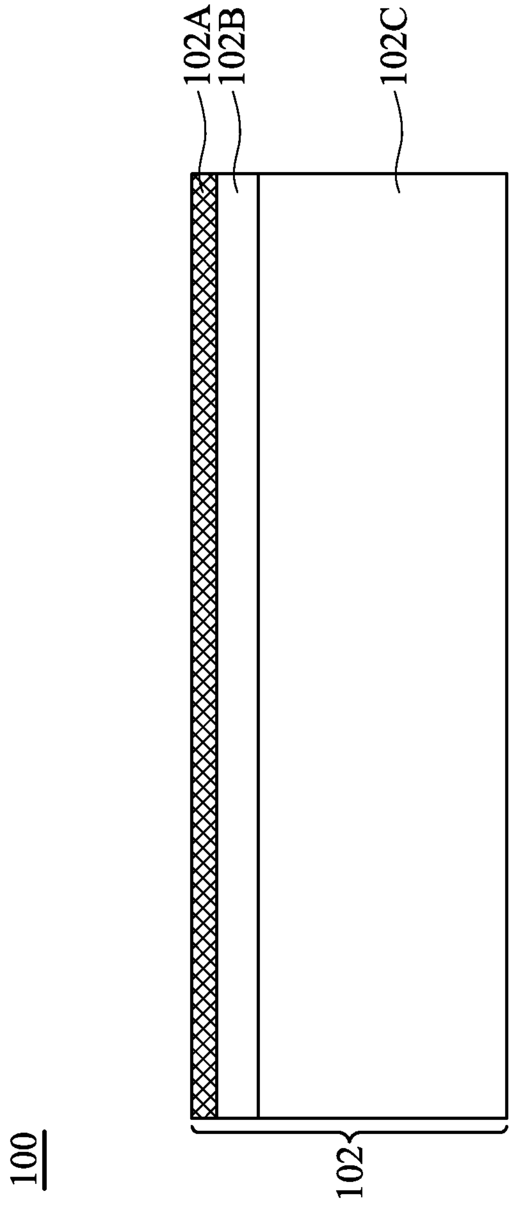
FIGS. 1-9 illustrate the formation of an optical engine, in accordance with some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. Additionally, arrows are used throughout the figures to indicate the paths of light (e.g., optical signals and/or optical power). It should be understood that for clarity the transmission of light is described along a path in one direction as indicated by arrows, but in some cases, light may also be transmitted in the reverse direction along the path.

A photonic package including an optical coupling structure for integrating optical fibers with an optical engine and the method of forming the same are provided. The optical coupling structure is a separate structure incorporated into the optical engine or the photonic package to facilitate transmission of optical signals and/or optical power between optical fibers and the optical engine. By forming the optical coupling structure as a separate structure, alignment can be improved and package design can be more flexible. Embodiments discussed herein are to provide examples to enable making or using the subject matter of this disclosure, and a person having ordinary skill in the art will readily understand modifications that can be made while remaining within contemplated scopes of different embodiments. Throughout the various views and illustrative embodiments, like reference numbers are used to designate like elements. Although method embodiments may be discussed as being performed in a particular order, other method embodiments may be performed in any logical order.

FIGS. 1 through 9 show cross-sectional views of intermediate steps of forming an optical engine 100 (see FIG. 9), in accordance with some embodiments. In some embodiments, the optical engine 100 may act as an input/output (I/O) interface between optical signals and electrical signals. One or more optical engines may be used in a photonic package, photonic structure, photonic system, or the like. The optical engine 100 comprises at least one optical coupling structure 200 (see FIG. 5) that facilitates optical communication with external optical components, such as optical fibers. In some embodiments, multiple optical engines 100 are formed on the same substrate (e.g., substrate 102 of FIG. 1) and then subsequently singulated into individual optical engines 100. In other embodiments, the substrate may be singulated prior to attachment of the electronic die 122 or optical coupling structure 200 (see FIG. 5).

Turning first to FIG. 1, a buried oxide ("BOX") substrate 102 is provided, in accordance with some embodiments. The BOX substrate 102 includes an oxide layer 102B formed over a substrate 102C, and a silicon layer 102A formed over the oxide layer 102B. The substrate 102C may be, for example, a material such as a glass, ceramic, dielectric, a semiconductor, the like, or a combination thereof. In some embodiments, the substrate 102C may be a semiconductor substrate, such as a bulk semiconductor or the like, which may be doped (e.g., with a p-type or an n-type dopant) or undoped. The substrate 102C may be a wafer, such as a silicon wafer (e.g., a 12 inch silicon wafer). Other substrates, such as a multi-layered or gradient substrate may also be used. In some embodiments, the semiconductor material of the substrate 102C may include silicon; germanium; a compound semiconductor including silicon carbide, gallium arsenic, gallium phosphide, indium phosphide, indium arsenide, and/or indium antimonide; an alloy semiconductor including silicon germanium, GaAsP, AlInAs, AlGaAs, GaInAs, GaInP, and/or GaInAsP; or combinations thereof. The oxide layer 102B may be, for example, a silicon oxide or the like. In some embodiments, the oxide layer 102B may have a thickness between about 0.5 μm and about 4 μm. The silicon layer 102A may have a thickness between about 0.1 μm and about 1.5 μm, in some embodiments. Other thicknesses or materials are possible. The BOX substrate 102 may be referred to as having a front side or front surface (e.g., the side facing upwards in FIG. 1), and a back side or back surface (e.g., the side facing downwards in FIG. 1).

Figure 2:
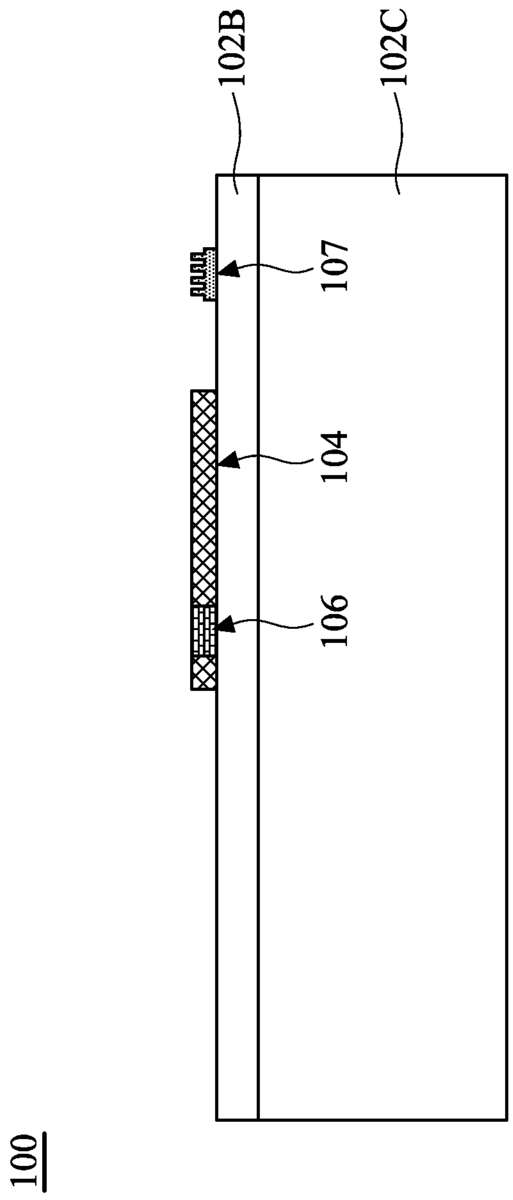

In FIG. 2, the silicon layer 102A is patterned to form silicon regions for waveguides 104, photonic components 106, and/or grating couplers 107, in accordance with some embodiments. In some cases, the silicon layer 102A may be referred to as an "active layer." The silicon layer 102A may be patterned using suitable photolithography and etching techniques. For example, a hardmask layer (e.g., a nitride layer or other dielectric material, not shown in FIG. 2) may be formed over the silicon layer 102A and patterned, in some embodiments. The pattern of the hardmask layer may then be transferred to the silicon layer 102A using one or more etching techniques, such as dry etching and/or wet etching techniques. For example, the silicon layer 102A may be etched to form recesses defining the waveguides 104, with sidewalls of the remaining unrecessed portions defining sidewalls of the waveguides 104. In some embodiments, more than one photolithography and etching sequence may be used in order to pattern the silicon layer 102A. One waveguide 104 or multiple waveguides 104 may be patterned from the silicon layer 102A. If multiple waveguides 104 are formed, the multiple waveguides 104 may be individual separate waveguides 104 or connected as a single continuous structure. In some embodiments, one or more of the waveguides 104 form a continuous loop. Other configurations or arrangements of waveguides 104, photonic components 106, or grating couplers 107 are possible. In some cases, the waveguides 104, the photonic components 106, and the grating couplers 107 may be collectively referred to as a "photonic layer." Though a silicon layer 102A is used in the described embodiments, in other embodiments the active layer may comprise other material(s) such as silicon nitride, silicon germanium, germanium, lithium niobate, a polymer, the like, or a combination thereof.

The photonic components 106 may be integrated with the waveguides 104, and may be formed with the silicon waveguides 104 in some embodiments. The photonic components 106 may be physically and/or optically coupled to the waveguides 104 to interact with optical signals within the waveguides 104. The photonic components 106 may include, for example, photodetectors, modulators, or the like. For example, a photodetector may be optically coupled to the waveguides 104 to detect optical signals within the waveguides 104 and generate electrical signals corresponding to the optical signals. A modulator may be optically coupled to the waveguides 104 to receive electrical signals and generate corresponding optical signals within the waveguides 104 by modulating optical power within the waveguides 104. In this manner, the photonic components 106 can facilitate the input/output (I/O) of optical signals to and from the waveguides 104. The photonic components may include other active or passive components, such as laser diodes, LEDs, optical signal splitters, phase shifters, resonators, amplifiers, optical cavities, evanescent couplers, edge couplers, or other types of structures or devices. Optical power may be provided to the waveguides 104 by, for example, from an optical fiber coupled to an external light source, or optical power may be provided by a photonic component 106 within the optical engine 100 such as a laser diode or the like. In some embodiments, optical power and/or optical signals may be transmitted to the waveguides 104 from an adjacent optical engine, photonic package, photonic structure, photonic system, photonic component, or the like.

In some embodiments, a photonic component 106 such as a photodetector may be formed by, for example, partially etching regions of the waveguides 104 and growing an epitaxial material on the remaining silicon of the etched regions. The waveguides 104 may be etched using acceptable photolithography and etching techniques. The epitaxial material may comprise, for example, a semiconductor material such as silicon germanium, germanium, or the like, which may be doped or undoped. In some embodiments, an implantation process may be performed to introduce dopants (e.g., p-type dopants, n-type dopants, or a combination) within the silicon of the etched regions or within the epitaxial material. In some embodiments, a photonic component 106 such as a modulator may be formed by, for example, partially etching regions of the waveguides 104 and then implanting appropriate dopants (e.g., p-type dopants, n-type dopants, or a combination) within the remaining silicon of the etched regions. The waveguides 104 may be etched using acceptable photolithography and etching techniques. In some embodiments, the etched regions used for photonic components 106 may be formed using one or more of the same photolithography or etching steps. In some embodiments, the etched regions used for photonic components 106 may be implanted using one or more of the same implantation steps. This is an example, and photonic component 106 may be formed using other materials or techniques in other embodiments.

The grating coupler 107 allows optical signals and/or optical power to be transferred between the waveguides 104 and an overlying optical component, such as an optical fiber, a mirror, another grating coupler, or the like. An optical engine 100 may include a single grating coupler 107 or multiple grating couplers 107. In some embodiments, the grating couplers 107 may be formed by patterning the silicon layer 102A using acceptable photolithography and etching techniques. In some embodiments, the grating couplers 107 are formed using the same photolithography or etching steps that form the waveguides 104 and/or the photonic components 106. In other embodiments, the grating couplers 107 are formed after the waveguides 104 and/or the photonic components 106 have been formed.

Figure 3:
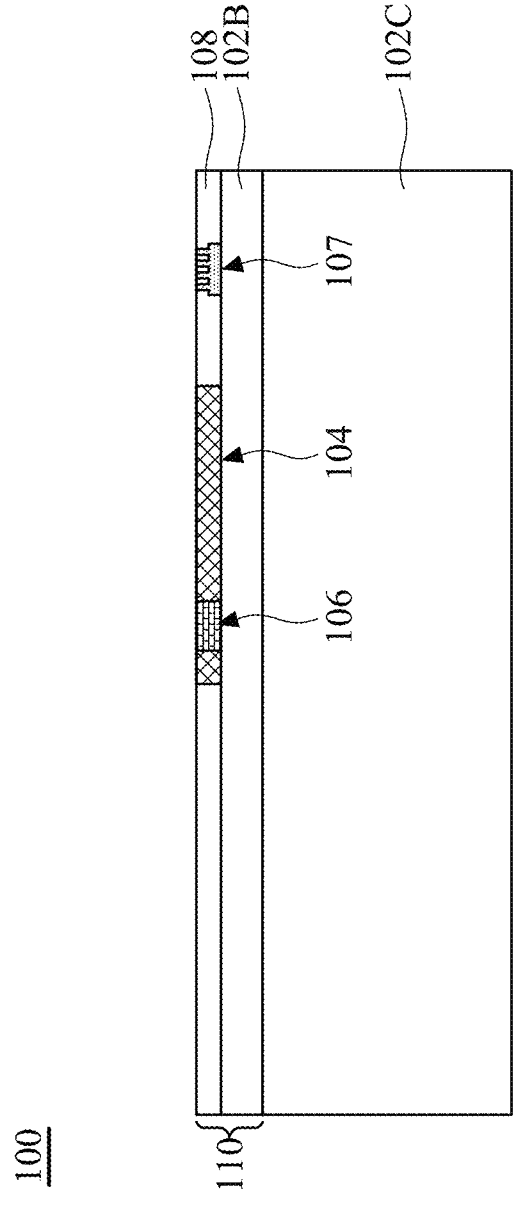

In FIG. 3, a dielectric layer 108 is formed on the front side of the BOX substrate 102 to form a photonic routing structure 110, in accordance with some embodiments. The dielectric layer 108 is formed over the waveguides 104, the photonic components 106, the grating couplers 107, and the oxide layer 102B. The dielectric layer 108 may be formed of one or more layers of silicon oxide, silicon nitride, a combination thereof, or the like, and may be formed by CVD, PVD, atomic layer deposition (ALD), a spin-on-dielectric process, the like, or a combination thereof. In some embodiments, the dielectric layer 108 may be formed by high density plasma chemical vapor deposition (HDP-CVD), flowable CVD (FCVD), the like, or a combination thereof. Other dielectric materials formed by any acceptable process may be used. In some embodiments, the dielectric layer 108 is planarized using a planarization process such as a CMP process, a grinding process, or the like. The planarization process may expose surfaces of the waveguides 104, the photonic components 106, and/or the grating couplers 107, in some embodiments.

Due to the difference in refractive indices of the materials of the waveguides 104 and dielectric layer 108, the waveguides 104 have high internal reflection such that light is substantially confined within the waveguides 104, depending on the wavelength of the light and the refractive indices of the respective materials. In an embodiment, the refractive index of the material of the waveguides 104 is higher than the refractive index of the material of the dielectric layer 108. For example, the waveguides 104 may comprise silicon, and the dielectric layer 108 may comprise silicon oxide and/or silicon nitride. In other embodiments, the waveguides 104 may be formed of silicon nitride or the like. Other materials are possible. In this manner, the waveguides 104 may comprise slab waveguides, ridge waveguides, rib waveguides, buried channel waveguides, diffused waveguides, or the like.

Figure 4:
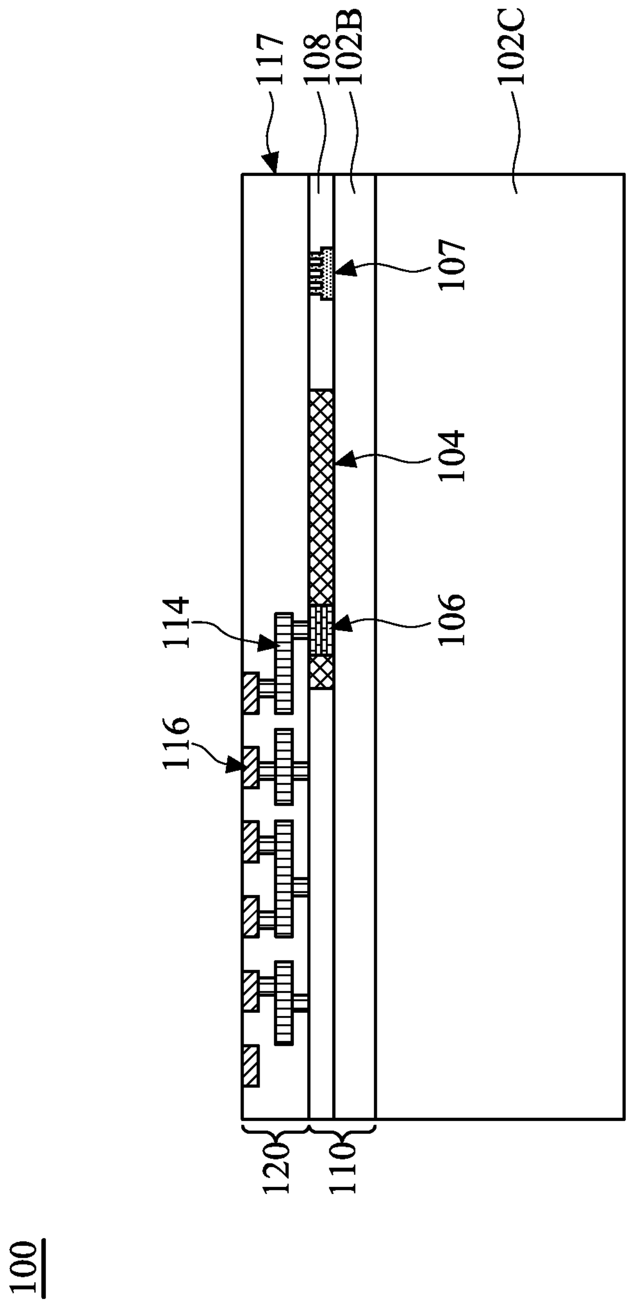

In FIG. 4, a redistribution structure 120 is formed over the dielectric layer 108, in accordance with some embodiments. The redistribution structure 120 includes one or more insulating layers 117, with conductive features 114 formed in the insulating layer(s) 117 that provide interconnections and electrical routing. The conductive features 114 may include, for example one or more layers of conductive lines, conductive vias, contact pads, bonding pads, metallization patterns, redistribution layers, or the like. In some embodiments, the conductive features 114 include contacts that physically and electrically contact one or more photonic components 106. The contacts allow electrical signals and/or electrical power to be transmitted to or from appropriate photonic components 106. In this manner, the redistribution structure 120 may electrically connect photonic components 106 to overlying electronic components (e.g., electronic die 122, see FIG. 5). In this manner, some photonic components 106 may convert electrical signals (e.g., from an electronic component) into optical signals that are transmitted by the waveguides 104, or some photonic components 106 may convert optical signals within the waveguides 104 into electrical signals that may be received by an electronic component.

The insulating layers 117 of the redistribution structure 120 may be, for example, dielectric layers or passivating layers, and may comprise one or more materials similar to those described above for the dielectric layer 108, such as silicon oxide, silicon nitride, the like, or another suitable material. The insulating layers 117 may be transparent or nearly transparent to light within a suitable range of wavelengths. The insulating layers 117 may be formed using a technique similar to those described above for the dielectric layer 108 or using a different technique. In some embodiments, the top-most insulating layer 117 (not individually labeled in the figures) may be a material suitable for dielectric-to-dielectric bonding, such as silicon oxide, silicon oxynitride, or the like. In such embodiments, the top-most insulating layer 117 may be considered a "bonding layer," and accordingly may be referred to as a "bonding layer" herein.

The conductive features 114 may be formed, for example, by forming openings (not separately illustrated) in an insulating layer 117. The openings may be formed using acceptable photolithography and etching techniques, such as by forming and patterning a photoresist and then performing an etching process using the patterned photoresist as an etching mask. The etching process may include, for example, a dry etching process and/or a wet etching process. Conductive material is then deposited in the openings, thereby forming conductive features 114 in the openings. In some embodiments, a liner (not shown), such as a diffusion barrier layer, an adhesion layer, or the like, may be deposited in the openings prior to deposition of the conductive material. The liner may comprise, for example, tantalum nitride, tantalum, titanium nitride, titanium, cobalt tungsten, or the like, and may be formed using a suitable deposition process such as CVD, PVD, ALD, or the like. In some embodiments, the conductive features 114 may be formed by depositing a seed layer (not shown) in the openings. The seed layer may be deposited on the liner, if present. The seed layer may comprise copper, a copper alloy, or the like, in some embodiments. The conductive material may then be formed in the openings using, for example, an electroplating process or an electro-less plating process. The conductive material may include, for example, a metal or a metal alloy such as copper, silver, gold, tungsten, cobalt, ruthenium, aluminum, or alloys thereof. A planarization process (e.g., a CMP process or a grinding process) may be performed to remove excess conductive material along, such that top surfaces of the conductive features 114 and the insulating layer 117 are approximately level. This is an example, and the conductive features 114 may be formed using a damascene process (e.g., single damascene, duel damascene) or another suitable process.

As shown in FIG. 4, conductive pads 116 may be formed in the top-most layer (e.g., the bonding layer) of the insulating layers 117. In some cases, the conductive pads 116 may be considered "bonding pads." A planarization process (e.g., a CMP process or the like) may be performed after forming the conductive pads 116 such that surfaces of the conductive pads 116 and the top-most insulating layer 117 are substantially coplanar (e.g., level). The redistribution structure 120 may include more or fewer insulating layers 117, conductive features 114, or conductive pads 116 than shown in FIG. 4, and may have a different arrangement or configuration.

Figure 5:
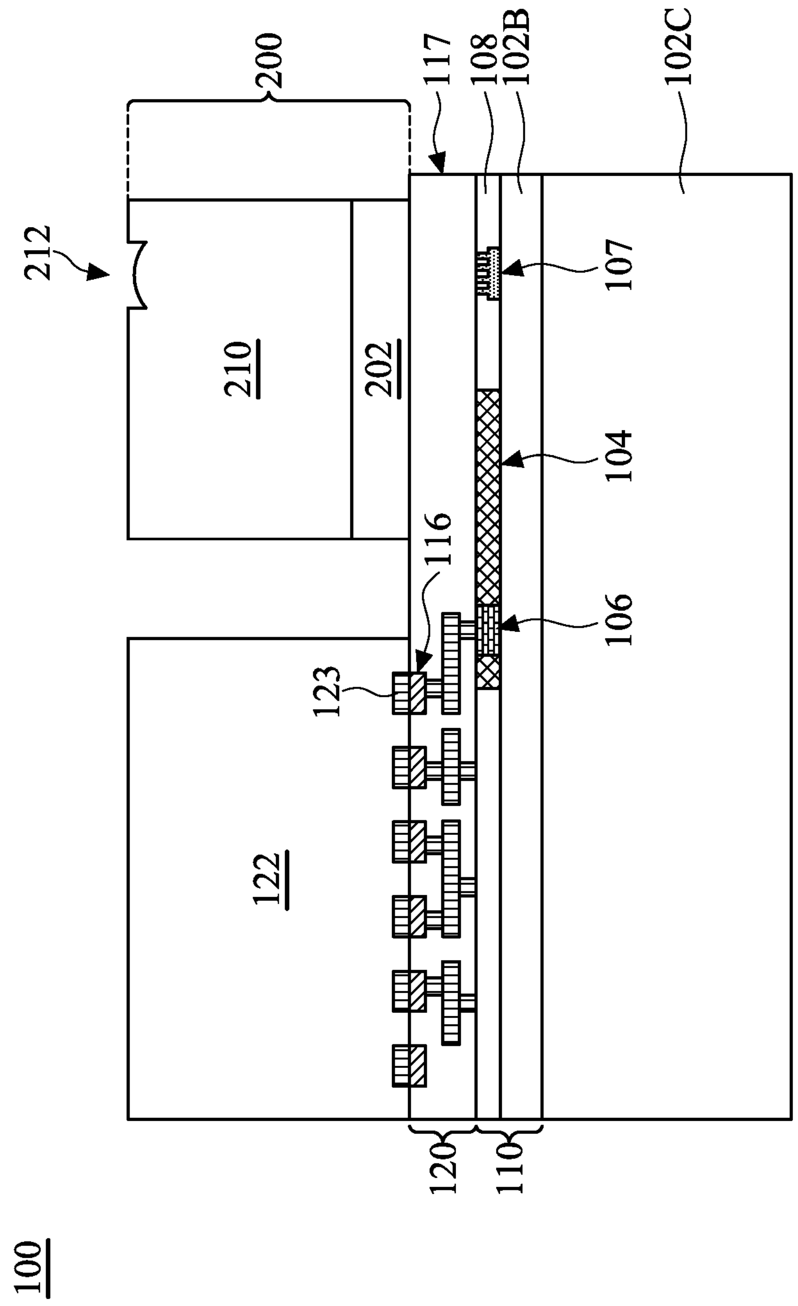

In FIG. 5, one or more electronic dies 122 and one or more optical coupling structures 200 are bonded to the redistribution structure 120, in accordance with some embodiments. The electronic dies 122 may be, for example, semiconductor devices, dies, or chips that communicate with the photonic components 106 using electrical signals. The optical coupling structures 200 (also referred to herein as "coupling structures 200") are passive structures comprising one or more optical or photonic components (e.g., waveguides, lenses, mirrors, edge couplers, etc.). The coupling structures 200 allow external optical fibers to be optically coupled to the waveguides 104, and thus allow optical signals and/or optical power to be transmitted between an external optical fiber and an optical engine 100. One electronic die 122 and one coupling structure 200 are shown in FIG. 5, but an optical engine 100 may include more than one electronic die 122 or more than one coupling structure 200 in other embodiments. In some cases, multiple electronic dies 122 or coupling structures 200 may be incorporated into a single optical engine 100 in order to reduce processing cost.

The electronic die 122 may be electrically connected to the photonic components 106 through the redistribution structure 120, and may include integrated circuits for interfacing with the photonic components 106, such as circuits for controlling the operation of the photonic components 106. For example, the electronic die 122 may include controllers, drivers, transimpedance amplifiers, the like, or combinations thereof. The electronic die 122 may include, for example, a chip, die, system-on-chip (SoC) device, system-on-integrated-circuit (SoIC) device, package, the like, or a combination thereof. The electronic die 122 may include one or more processing devices, such as a central processing unit (CPU), a graphics processing unit (GPU), an application-specific integrated circuit (ASIC), a high performance computing (HPC) die, the like, or a combination thereof. The electronic die 122 may include one or more memory devices, which may be a volatile memory such as dynamic random-access memory (DRAM), static random-access memory (SRAM), high-bandwidth memory (HBM), another type of memory, or the like. In some embodiments, the electronic die 122 includes circuits for processing electrical signals received from photonic components 106, such as for processing electrical signals received from a photonic component 106 comprising a photodetector. The electronic die 122 may control high-frequency signaling of the photonic components 106 according to electrical signals (digital or analog) received from another device or die, in some embodiments. In some embodiments, the electronic die 122 may be an electronic integrated circuit (EIC) or the like that provides Serializer/Deserializer (SerDes) functionality. In this manner, the electronic die 122 may act as part of an I/O interface between optical signals and electrical signals within an optical engine 100, and the optical engine 100 described herein could be considered a system-on-chip (SoC) device or a system-on-integrated-circuit (SoIC) device.

In some embodiments, the electronic die 122 is bonded to the redistribution structure 120 by dielectric-to-dielectric bonding and/or metal-to-metal bonding (e.g., direct bonding, fusion bonding, oxide-to-oxide bonding, hybrid bonding, or the like). In such embodiments, covalent bonds may be formed between bonding layers, such as the top-most insulating layer 117 and surface dielectric layers (not separately indicated) of the electronic die 122. The bonding layers may be oxide layers or layers of other dielectric materials. During the bonding, metal-to-metal bonding may also occur between die connectors 123 of the electronic die 122 and conductive pads 116 of the redistribution structure 120. The die connectors 123 may be, for example, conductive pads, conductive pillars, or the like. In other embodiments, the electronic die 122 may be bonded to the redistribution structure 120 using solder bonding, solder bumps, or the like.

The coupling structure 200 shown in FIG. 5 comprises a coupling substrate 210, a lens 212 formed in a top surface of the coupling substrate 210, and dielectric layers 202 formed on a bottom surface of the coupling substrate 210. The coupling substrate 210 is transparent or nearly transparent to light within a suitable range of wavelengths. For example, the coupling substrate 210 may comprise one or more materials such as silicon (e.g., a silicon wafer, bulk silicon, or the like), silicon oxide, silicon oxynitride, silicon nitride, glass, or another type of material. The dielectric layers 202 may include one or more layers of dielectric material(s) that are transparent or nearly transparent to light within a suitable range of wavelengths. In some cases, the material(s) of the dielectric layers 202 may be similar to the material(s) of the dielectric layer 108 or the insulating layers 117 and may be formed using similar techniques. For example, the dielectric layers 202 may include one or more layers of silicon oxide or the like. In some embodiments, the bottom-most dielectric layer 202 (not individually labeled in the figures) may be a material suitable for dielectric-to-dielectric bonding, such as silicon oxide, silicon oxynitride, or the like. In such embodiments, the bottom-most dielectric layer 202 may be considered a "bonding layer," and accordingly may be referred to as a "bonding layer" herein.

The lens 212 is formed in a top surface of the coupling substrate 210 to facilitate optical coupling between an optical fiber and an underlying grating coupler 107, in accordance with some embodiments. For example, a lens 212 may receive light from an optical fiber and redirect, reshape, or focus the light into a corresponding grating coupler 107. In this manner, the grating coupler 107 can receive optical signals from the optical fiber through the lens 212 and couple the optical signals into the waveguides 104. In some embodiments, the lens 212 may be formed by shaping the material of the coupling substrate 210 using suitable masking and etching processes. However, any suitable process may be utilized. Lenses similar to lens 212 may be formed in opposite sides (e.g., in the top surface and the bottom surface) of the coupling substrate 210 in other embodiments, some examples of which are described below. In some embodiments, a protective material (not shown) may be deposited on the lens 212 to protect the lens 212 during subsequent processing steps. The protective material may be a sacrificial material that is subsequently removed, or may be a transparent material that remains on the lens 212.

In some embodiments, the coupling structure 200 is formed and then bonded to the redistribution structure 120. For example, the lens 212 may be formed in the coupling substrate 210 and the dielectric layers 202 may be deposited on the coupling substrate 210, forming the coupling structure 200 as a separate structure. Then the bottom-most dielectric layer 202 (e.g. the bonding layer) may be bonded to the top-most insulating layer 117 (e.g. the bonding layer) using dielectric-to-dielectric bonding (e.g., direct bonding, fusion bonding, oxide-to-oxide bonding, or the like).

Figure 6:
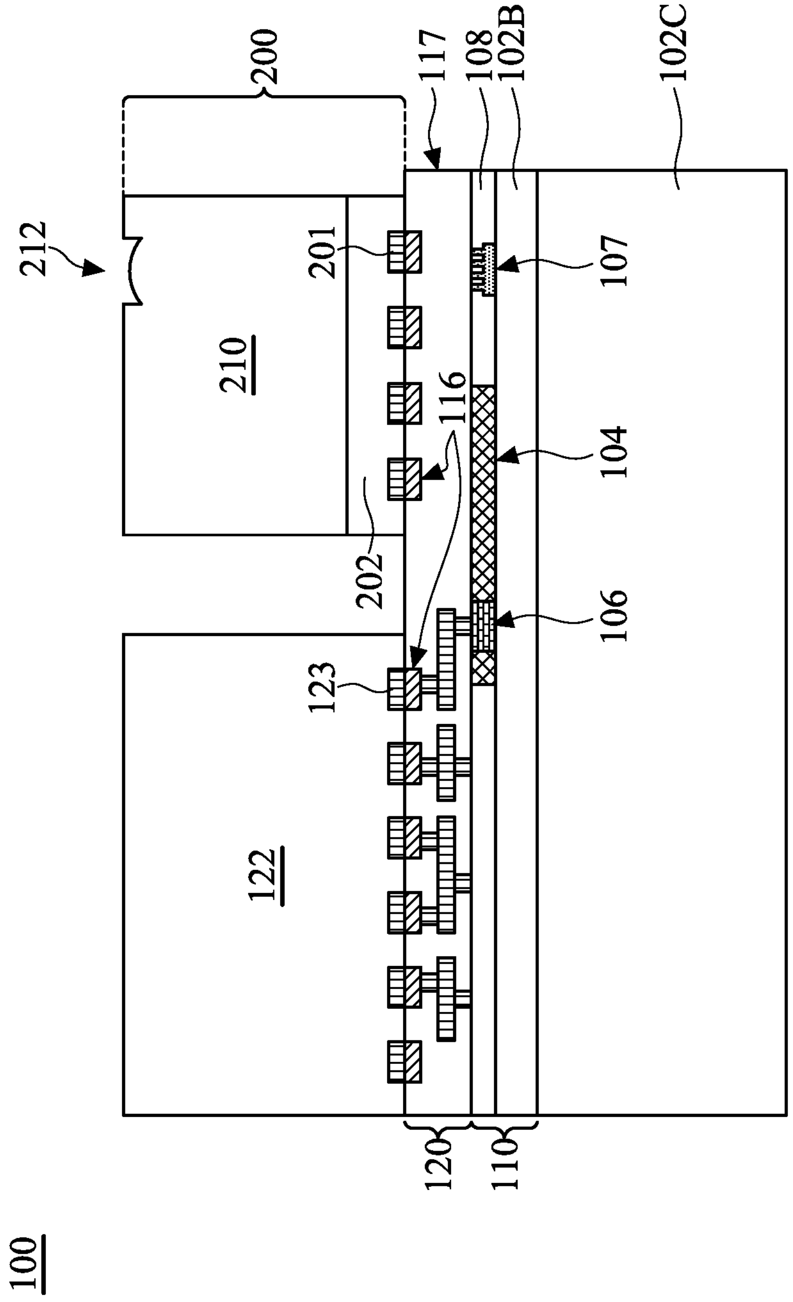

In some embodiments, the coupling structure 200 is bonded to the redistribution structure 120 by both dielectric-to-dielectric bonding and metal-to-metal bonding (e.g., direct bonding, fusion bonding, oxide-to-oxide bonding, hybrid bonding, or the like). An example embodiment is shown in FIG. 6, in which the coupling structure 200 comprises bonding pads 201 formed in the bottom-most dielectric layer 202 (e.g., the bonding layer). The bonding pads 201 may be bonded to conductive pads 116 of the redistribution structure 120 using metal-to-metal bonding. The bonding pads 201 may be, for example, conductive pads, conductive pillars, or the like. In other embodiments, the coupling structure 200 may be bonded to the redistribution structure 120 using solder bonding, solder bumps, or the like. The coupling structure 200 of FIG. 6 is presented as an illustrative example, and other optical coupling structures described herein may comprise bonding pads 201 and may be bonded using metal-to-metal bonding in addition to or instead of dielectric-to-dielectric bonding, even if not explicitly described or shown as such. The optical coupling structure 200 shown in FIGS. 5 and 6 are non-limiting examples, and non-limiting examples of some other optical coupling structures 200 having other configurations are described below.

In some embodiments, the coupling structure 200 is placed on the redistribution structure 120 and aligned before bonding. For example, the coupling structures 200 shown in FIGS. 5-6 may be placed or aligned such that the lens 212 is optically coupled with the grating coupler 107. In some embodiments, the coupling structure 200 may be aligned such that the lens 212 is vertically above (e.g., directly above) the grating coupler 107, such that the lens 212 is approximately centered over the grating coupler 107, or such that the lens 212 is laterally offset from the grating coupler 107. Other coupling structures 200 may be appropriately placed or aligned to optically couple other features in other embodiments, some of which are described below. The alignment of the coupling structure 200 may include a passive alignment process and/or an active alignment process. In some cases, the formation of an optical coupling structure as a separate structure as described herein can allow for more flexible, easier, and improved alignment between features such as waveguides, grating couplers, edge couplers, evanescent couplers, optical fibers, or the like. Forming a coupling structure as a separate structure can also allow for more flexible design, smaller package size, and reduced optical coupling loss between features. In some cases, the optical coupling structures described herein may be considered "optical connection adapters," "optical dies," or "dummy dies," in some cases.

Figure 7:
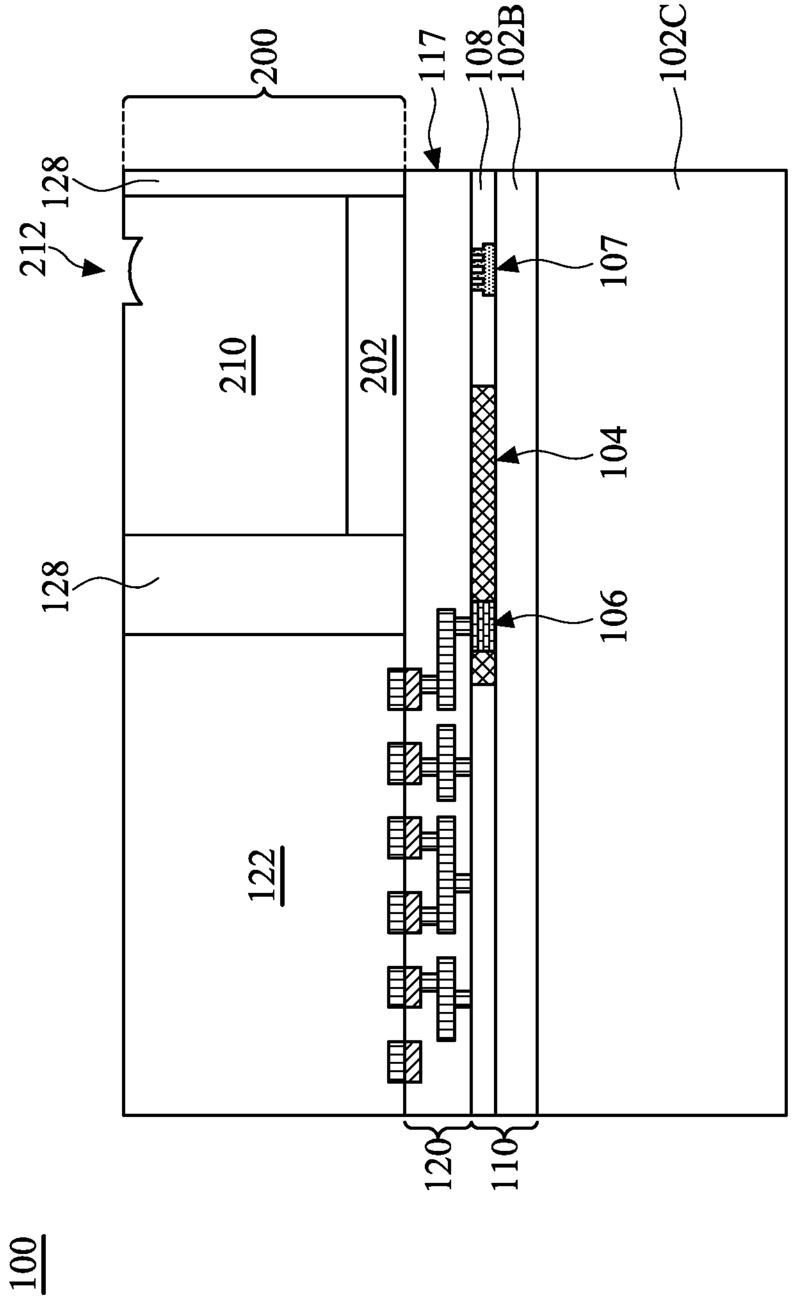

In FIG. 7, an encapsulant 128 is deposited on the redistribution structure 120, in accordance with some embodiments. The encapsulant 128 may be, for example, a molding material, an epoxy, a polymer, or the like. The encapsulant 128 may surround the electronic die(s) 122 and/or the coupling structure(s) 200, in some embodiments. In some embodiments, a planarization process (e.g., a CMP process or grinding process) is performed to remove excess encapsulant 128. The planarization process may expose top surfaces of the electronic die(s) 122 and/or the coupling structure(s) 200. Top surfaces of the encapsulant 128, the electronic die(s) 122, and/or the coupling structure(s) 200 may be approximately level after performing the planarization process.

Figure 8:
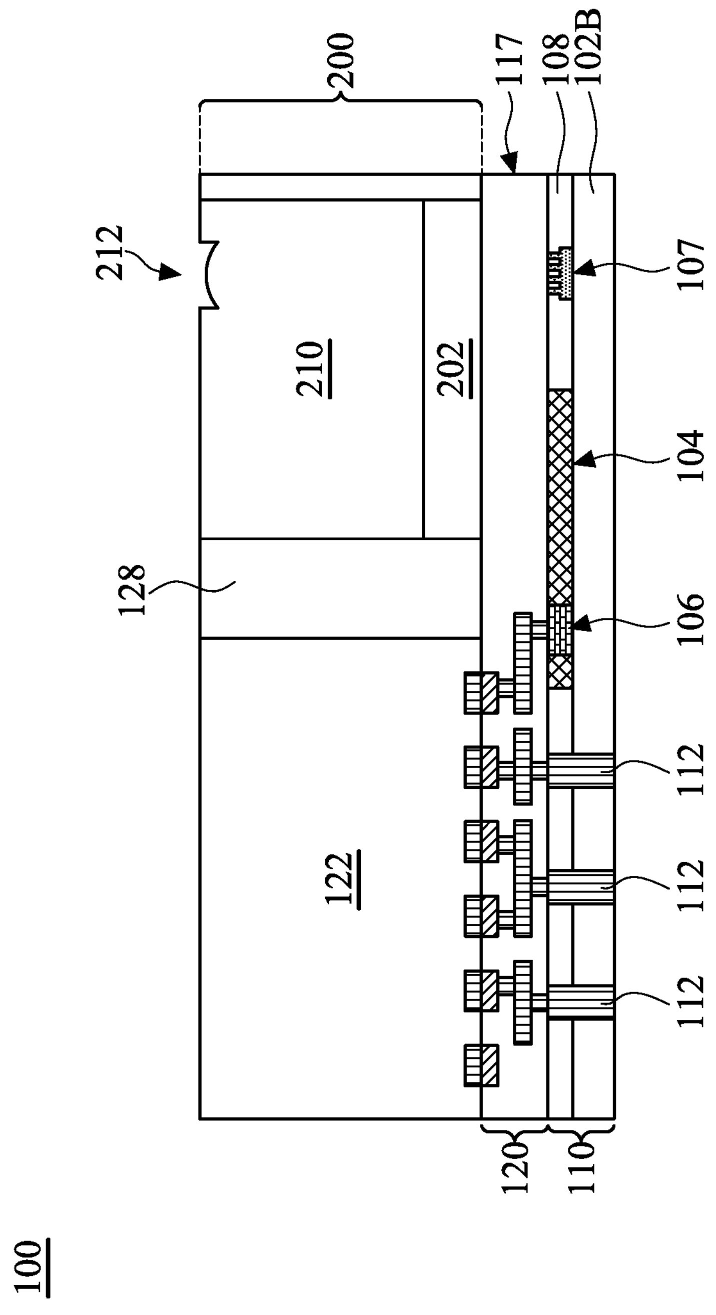

In FIG. 8, the substrate 102C is removed and vias 112 are formed in the photonic routing structure 110, in accordance with some embodiments. The substrate 102C may be removed using a CMP process, a grinding process, an etching process, the like, or a combination thereof. The vias 112 may be formed, for example, by forming openings through the oxide layer 102B and the dielectric layer 108 that expose conductive features of the redistribution structure 120. The openings may be formed using suitable photolithography and etching techniques. An optional liner and a conductive material may then be deposited in the openings to form the vias 112 that are electrically connected to the redistribution structure 120. A planarization process (e.g., a CMP process or a grinding process) may be performed to remove excess conductive material, and surfaces of the vias 112 and the oxide layer 102B may be level after performing the planarization process. This is an example, and the vias 112 may be formed using other techniques. For example, in other embodiments, the vias 112 are formed before forming the redistribution structure 120 and/or before attaching the electronic die 122 and the coupling structure 200. In other embodiments, the vias 112 are formed before removing the substrate 102C. In other embodiments, the substrate 102C is thinned but not completely removed, and the vias 112 extend through the thinned substrate 102C.

Figure 9:
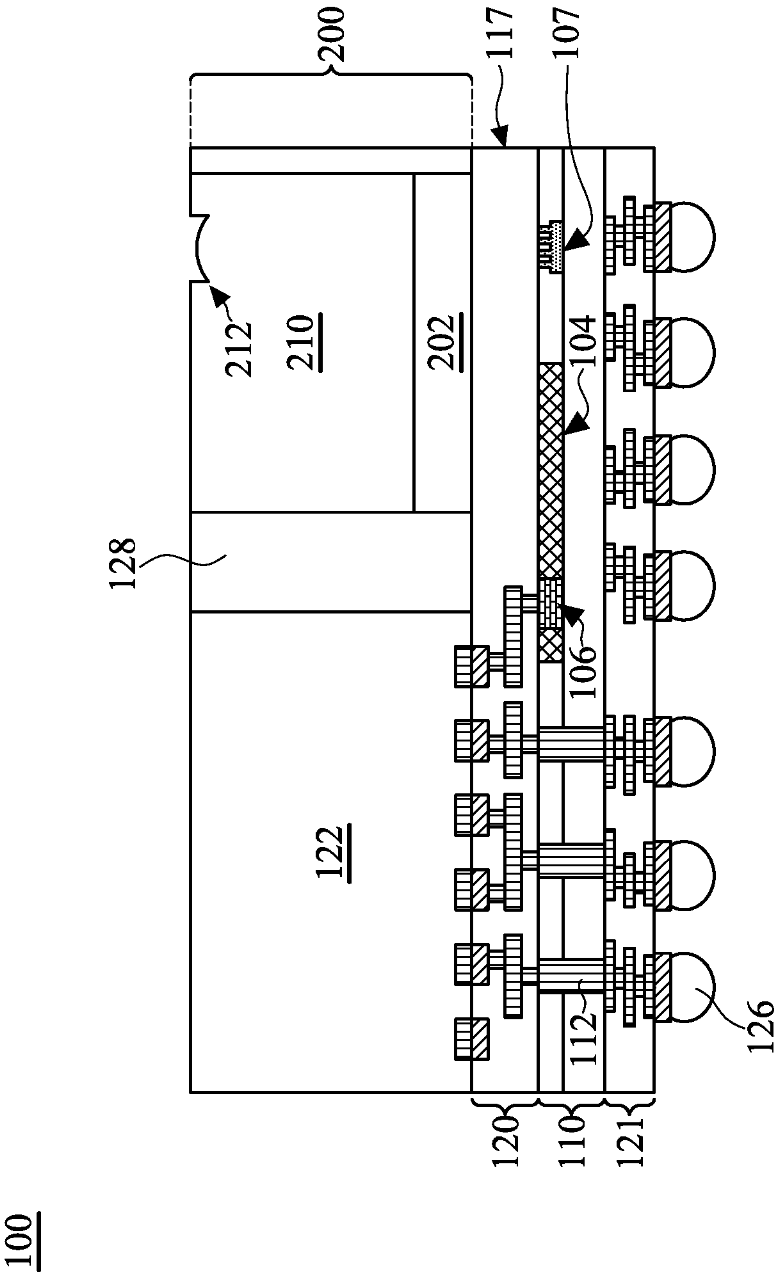

In FIG. 9, a redistribution structure 121 is formed on the photonic routing structure 110, in accordance with some embodiments. The redistribution structure 121 includes dielectric layers and conductive features formed in the dielectric layers, in some embodiments. The redistribution structure 121 provides interconnections and electrical routing, and may be electrically connected to the vias 112. The dielectric layers may be, for example, insulating or passivating layers, and may include a material similar to those described above for the dielectric layer 108 or the insulating layers 117. The conductive features of the redistribution structure 121 may include conductive lines and vias, and may be formed using materials or techniques similar to those of the conductive features 114 or using different materials or techniques. For example, the conductive features of the redistribution structure 121 may be formed using a damascene process, e.g., dual damascene, single damascene, or the like.

In some embodiments, conductive connectors 126 are formed on the redistribution structure 121, in accordance with some embodiments. The conductive connectors 126 are electrically connected to the redistribution structure 121. In some embodiments, the conductive connectors 126 include conductive pads formed in or on the redistribution structure 121. The conductive pads may include, for example, copper pads, aluminum pads, aluminum-copper pads, underbump metallizations (UBMs), or the like, although other conductive pads are possible.

The conductive connectors 126 may include solder balls, solder bumps, or the like formed on the conductive pads, in some embodiments. For example, the conductive connectors 126 may include ball grid array (BGA) connectors, solder balls, metal pillars, controlled collapse chip connection (C4) bumps, micro bumps, electroless nickel-electroless palladium-immersion gold technique (ENEPIG) formed bumps, or the like. The conductive connectors 126 may include a conductive material such as solder, copper, aluminum, gold, nickel, silver, palladium, tin, the like, or a combination thereof. In some embodiments, the conductive connectors 126 are formed by initially forming a layer of solder through such commonly used methods such as evaporation, electroplating, printing, solder transfer, ball placement, or the like. Once a layer of solder has been formed on the structure, a reflow may be performed in order to shape the material into the desired bump shapes. In another embodiment, the conductive connectors 126 include metal pillars (such as a copper pillar) formed by a sputtering, printing, electro plating, electroless plating, CVD, or the like. The metal pillars may be solder free and have substantially vertical sidewalls. In some embodiments, a metal cap layer (not shown) is formed on the top of the conductive connectors 126. The metal cap layer may include nickel, tin, tin-lead, gold, silver, palladium, indium, nickel-palladium-gold, nickel-gold, the like, or a combination thereof and may be formed by a plating process.

Figure 10:
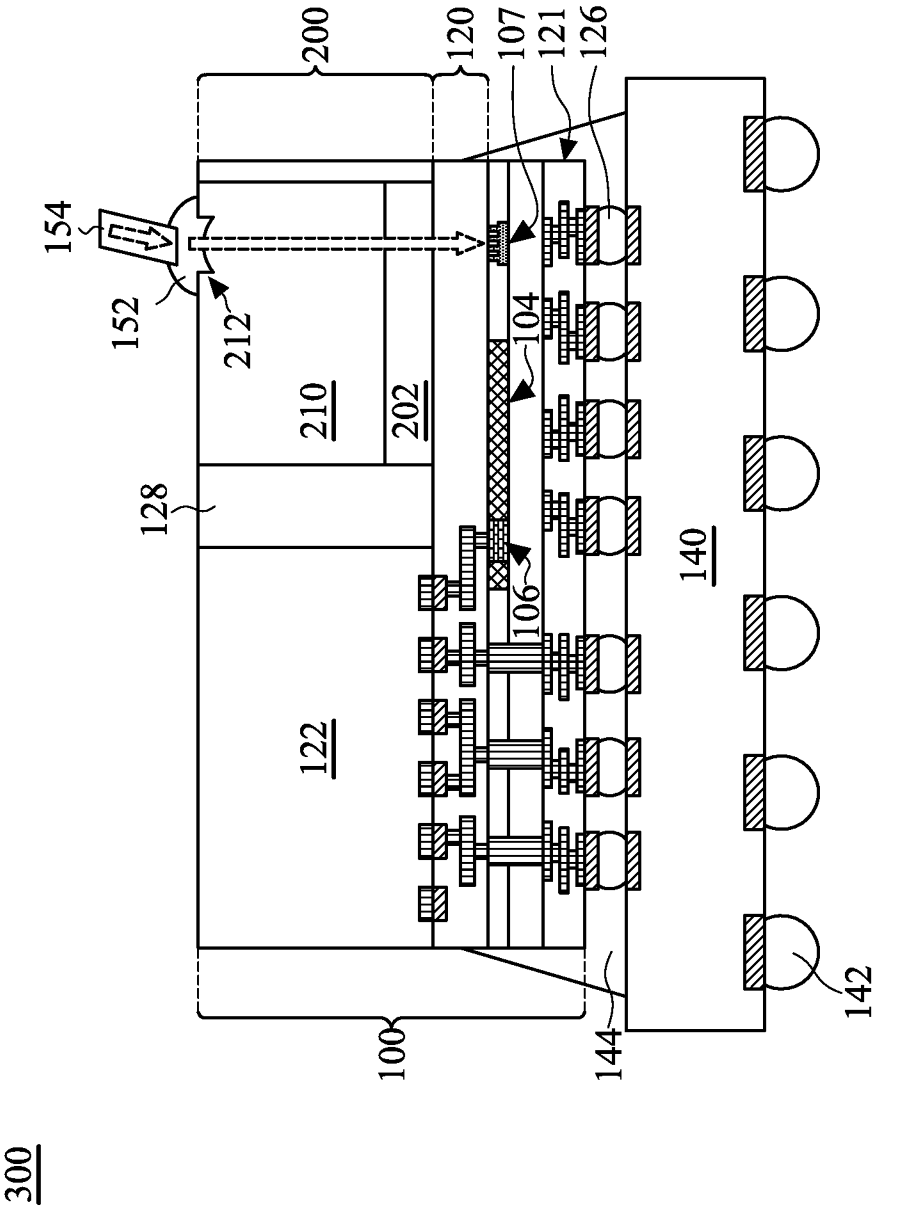
FIG. 10 illustrates a photonic package, in accordance with some embodiments.

FIG. 10 illustrates a photonic package 300 comprising an optical engine 100 attached to a package substrate 140, in accordance with some embodiments. Multiple optical engines 100 may be attached to the package substrate 140 in other embodiments. The optical engine 100 may be similar to the optical engine 100 shown in FIG. 9 or may be similar to other optical engines described herein. In some embodiments, the package substrate 140 comprises conductive pads, conductive routing, and/or other conductive features that provide interconnections and electrical routing. In some embodiments, the package substrate 140 may comprise an interposer, a semiconductor substrate, a redistribution structure, an interconnect substrate, a core substrate, a printed circuit board (PCB), or the like. In some embodiments, the package substrate 140 comprises active and/or passive devices. In other embodiments, the package substrate 140 is free of active and/or passive devices. In some embodiments, conductive connectors 142 are formed on the package substrate 140. The conductive connectors 142 may be similar to the conductive connectors 126 described previously for FIG. 9, and may be formed using similar materials or techniques. For example, the conductive connectors 142 may comprise solder bumps or the like.

In some embodiments, the conductive connectors 126 of the optical engine 100 are placed on corresponding conductive pads of the package substrate 140 and then a reflow process is performed to bond the optical engine 100 to the package substrate 140. In this manner, the optical engine 100 may be electrically connected to the package substrate 140. In other embodiments, the optical engine 100 may be bonded to the package substrate 140 using dielectric-to-dielectric bonding and/or metal-to-metal bonding (e.g., direct bonding, fusion bonding, oxide-to-oxide bonding, hybrid bonding, or the like). In some embodiments, an underfill 144 may be deposited between the optical engine 100 and the package substrate 140.

As shown in FIG. 10, an optical fiber 154 may be attached to the coupling structure 200, in some embodiments. The optical fiber 154 may be attached over the lens 212, and may be secured using an optical glue 152 or the like. As described previously, light from the optical fiber 154, represented in FIG. 10 by arrows, may be directed from the lens 212 through the coupling substrate 210 and the redistribution structure 120 and into the grating coupler 107. In this manner, optical signals and/or optical power may be transmitted from the optical fiber 154 to the waveguides 104 of the optical engine 100. Similarly, light from the waveguides 104 may be directed from the grating coupler 107 through the coupling substrate 210 to the lens 212, and from the lens 212 into the optical fiber 154, in some cases. The use of a coupling structure 200 can allow for improved optical coupling between an optical fiber 154 and a photonic package 300.

Figure 11:
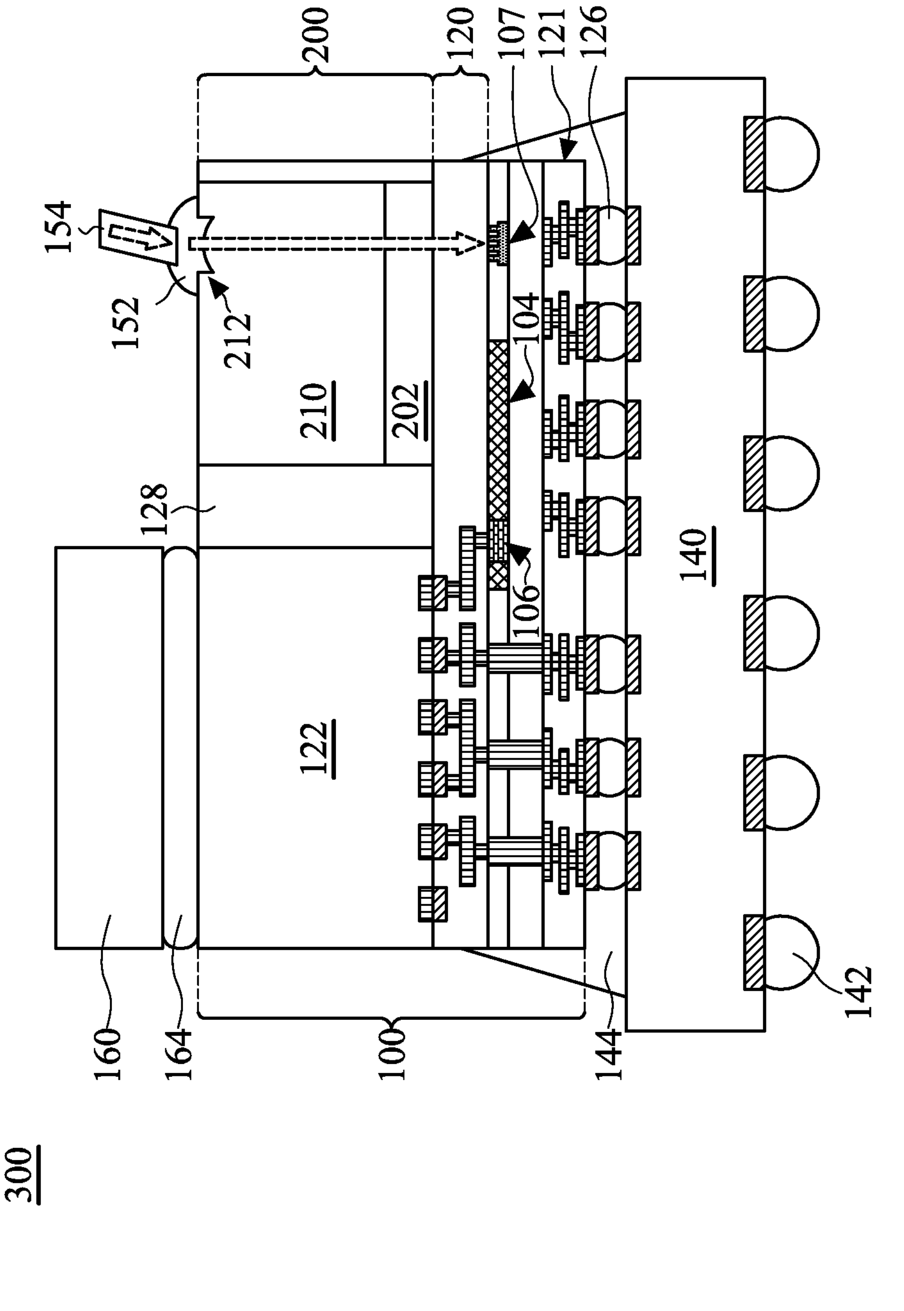
FIG. 11 illustrates a photonic package with a heat dissipation structure, in accordance with some embodiments.

FIG. 11 illustrates a photonic package 300 with an optional heat dissipation structure 160, in accordance with some embodiments. The heat dissipation structure 160 may be attached to heat-generating portions of an optical engine 100, such as the electronic die(s) 122. In some embodiments, a thermal material 164 (e.g., a TIM, heat sink compound, or the like) may be present between the electronic die(s) 122 and the heat dissipation structure 160. The heat dissipation structure 160 may comprise, for example, a heat sink, liquid cooling structure, or another thermally dissipating structure formed of any suitable materials, such as a semiconductor (e.g., a silicon wafer, bulk silicon, or the like), a dielectric (e.g., bulk oxide or the like), a metal, or the like. Any of the embodiments described herein may include one or more optional heat dissipation structures 160 attached to one or more electronic dies 122 or to other features.

Figure 12:
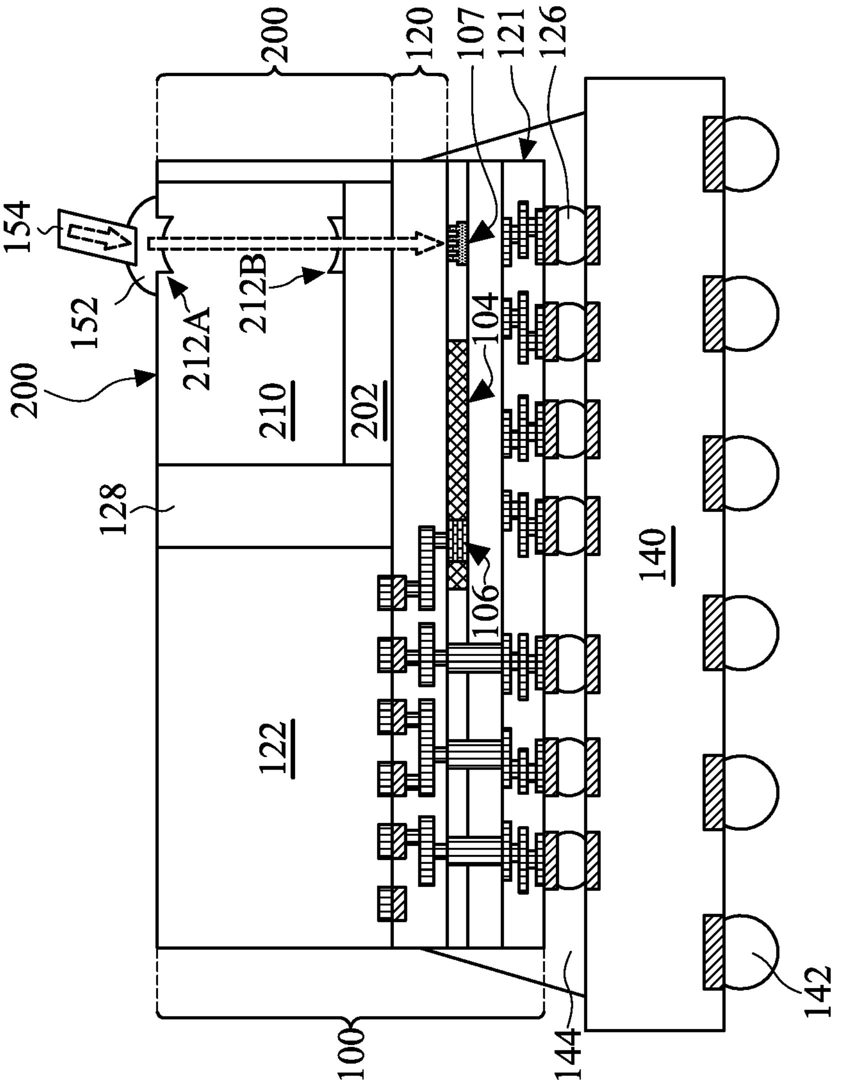
FIGS. 12 and 13 illustrate photonic packages, in accordance with some embodiments.

FIG. 12 illustrates a photonic package 310, in accordance with some embodiments. The photonic package 310 is similar to the photonic package 300 of FIG. 10, except that the optical coupling structure 200 comprises a lens 212B formed on the bottom side of the coupling substrate 210 in addition to a lens 212A formed on the top side of the coupling substrate 210. The use of the additional lens 212B may allow for improved coupling of light between an optical fiber 154 and a grating coupler 107, in some cases. For example, the lens 212B may receive light (represented by the arrows in FIG. 12) transmitted from an optical fiber 154 into the lens 212A and through the coupling substrate 210 and focus the light into the grating coupler 107. In other embodiments, only the lens 212B may be present.

Figure 13:
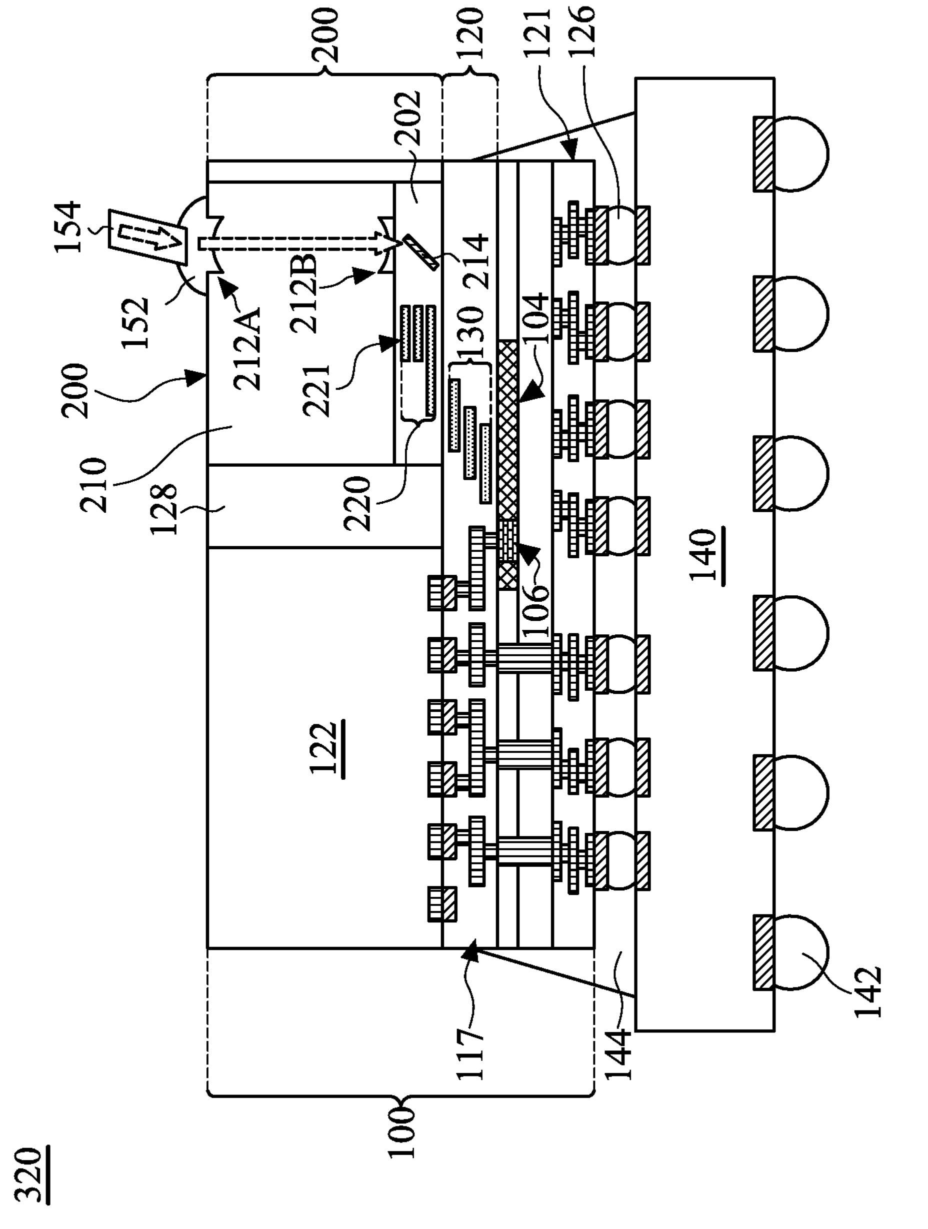

FIG. 13 illustrates a photonic package 320, in accordance with some embodiments. The photonic package 320 is similar to the photonic package 310 of FIG. 12, except that light is coupled into the waveguides 104 using evanescent coupling rather than using a grating coupler. The optical engine 100 of FIG. 13 is similar to the optical engine 100 of FIG. 9 except that the redistribution structure 120 includes one or more waveguides 130 within the insulating layers 117, and a grating coupler 107 is not present. The coupling structure 200 of FIG. 13 is similar to the coupling structure 200 of FIG. 12, except that waveguides 220, edge coupler 221, and a mirror 214 are formed in the dielectric layers 202.

The waveguides 130 within the redistribution structure 120 of the optical engine 100 may be formed during formation of the redistribution structure 120, and may include one or more layers of waveguides 130 formed on one or more insulating layers 117. For example, a waveguide 130 may be formed by depositing a layer of material on a insulating layer 117 and then patterning the layer of material. The layer of material may be patterned using suitable photolithography and etching techniques. The layer of material may be, for example, silicon, silicon nitride, or another material deposited using CVD, PVD, ALD, or another suitable technique. For example, in some embodiments, the waveguides 130 are silicon nitride waveguides formed within insulating layers 117 that are silicon oxide layers, though other materials are possible. In some embodiments, a waveguide 130 may overlap and be optically coupled to an underlying waveguide 130 such that optical signals and/or optical power may be transmitted between a waveguide 130 and an overlying waveguide 130 and/or an underlying waveguide 130. The waveguides 130 may be evanescently coupled to other waveguides 130 or other waveguides 104, and in some embodiments may use evanescent coupling structures similar to those described below for FIGS. 16A-B.

The waveguides 220 within the dielectric layers 202 of the coupling structure 200 may include one or more layers of waveguides 220 formed on one or more dielectric layers 202. For example, a waveguide 220 may be formed by depositing a layer of material on a dielectric layer 202 and then patterning the layer of material. The layer of material may be patterned using suitable photolithography and etching techniques. The layer of material may be, for example, silicon, silicon nitride, or another material deposited using CVD, PVD, ALD, or another suitable technique. For example, in some embodiments, the waveguides 220 are silicon nitride waveguides formed within dielectric layers 202 that are silicon oxide layers, though other materials are possible. In some embodiments, a waveguide 220 may overlap and be optically coupled to an underlying waveguide 220 such that optical signals and/or optical power may be transmitted between a waveguide 220 and an overlying waveguide 220 and/or an underlying waveguide 220. In some embodiments, one or more waveguides 220 may be optically coupled to one or more waveguides 130 such that optical signals and/or optical power may be transmitted between the waveguides 220 and the waveguides 130. The waveguides 220 may be evanescently coupled to other waveguides 220 or other waveguides 130, and in some embodiments may use evanescent couplers similar to those described below for FIGS. 16A and 16B, though other couplers are possible.

The mirror 214 may be formed in the dielectric layers 202 to receive light from an approximately vertical direction (e.g., from the fiber 154) and redirect the light in an approximately horizontal direction. In this manner, the mirror 214 may have an effective angle of about 45° with respect to the horizontal. In some embodiments, the mirror 214 may be formed by etching the dielectric layers 202 to form a suitably-shaped recess using suitable masking and etching processes, and then depositing a reflective layer into the recess. The reflective layer may comprise, for example, one or more layers of high-reflectance metal or one or more layers of suitable dielectric material(s). However, any suitable materials or processes may be utilized.

The edge coupler 221 may be formed in the dielectric layers 202 to receive horizontally transmitted light (e.g., light from the mirror 214) and couple the light into a waveguide 220. In some cases, the edge coupler 221 may also receive light from a waveguide 220 and transmit the light externally from the waveguide 220 in a horizontal direction, such as towards the mirror 214. In some cases, the edge coupler 221 may be considered part of the waveguides 220. In some embodiments, the edge coupler 221 may be a "multicore" edge coupler similar to the edge coupler 221 described below for FIGS. 15A-15C, though other edge couplers are possible. For example, in other embodiments, the edge coupler may be a single core tapered edge coupler or the like.

Figure 14:
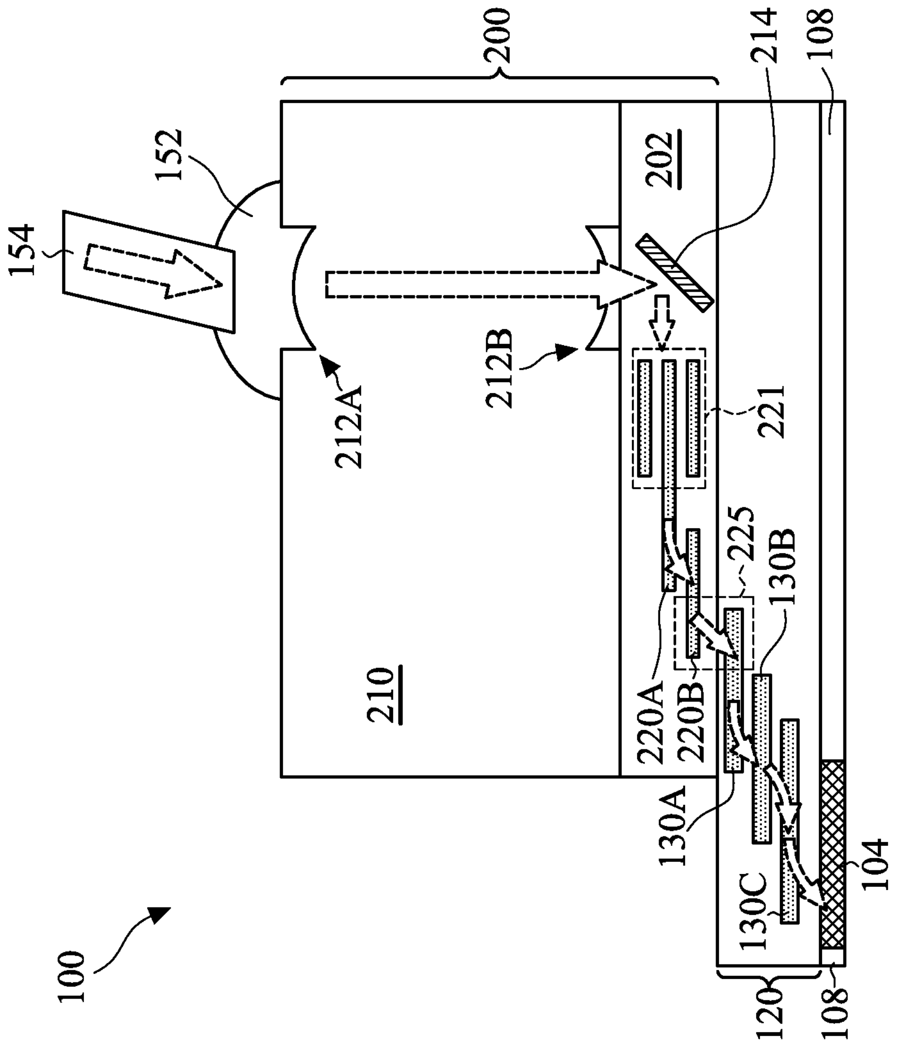
FIG. 14 illustrates a magnified view of a photonic package, in accordance with some embodiments.

FIG. 14 illustrates a magnified portion of an optical engine 100 similar to that shown in FIG. 13 for the photonic package 320. Some features of the optical engine 100 are omitted in FIG. 14, and an optical engine 100 may have a different configuration in other embodiments. As shown by the arrows in FIG. 14, light from an optical fiber 154 may be received by a lens 212A, transmitted through the coupling substrate 210, and received by a lens 212B, similar to the embodiment of FIG. 12. The lens 212B may focus the light toward the mirror 214, which reflects or redirects the light horizontally toward an edge coupler 221. The edge coupler 221 receives the light and couples it into a waveguide 220A. An embodiment of the edge coupler 221 is described in greater detail below for FIGS. 15A-15C. The light is then coupled from the waveguide 220A into the underlying waveguide 220B. The light may be coupled between the waveguides 220A-B using evanescent coupling, in some embodiments. The light is then coupled from the waveguide 220B into the underlying waveguide 130A. In this manner, the edge coupler 221 is optically coupled to the waveguide 130A. The light may be coupled between the waveguides 220B and 130A using evanescent coupling, in some embodiments. An embodiment of an evanescent coupling 225 between the waveguides 220B and 130A is described in greater detail below for FIGS. 16A-16B. The light is then coupled from the waveguide 130A to the waveguide 130B and then to the waveguide 130C. The light may be coupled between the waveguides 130A-C using evanescent coupling, in some embodiments. The light is then coupled from the waveguide 130C into the underlying waveguide 104. The light may be coupled between the waveguides 130C and 104 using evanescent coupling, in some embodiments. In this manner, optical signals and/or optical power may be transmitted between an optical fiber 154 and a waveguide 104 of an optical engine 100. In other embodiments, other numbers, arrangements, or configurations of waveguides, edge couplers, or evanescent couplers are possible, or light may follow a different path than shown.

Figure 15C:
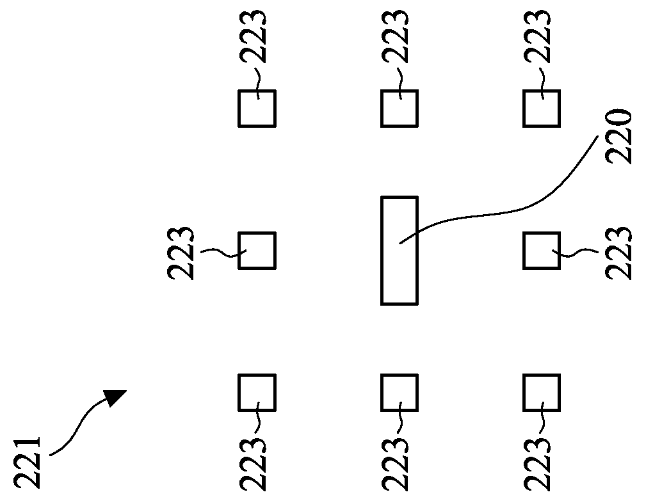
FIGS. 15A, 15B, and 15C illustrate various views of an edge coupler, in accordance with some embodiments.
Figure 15B:
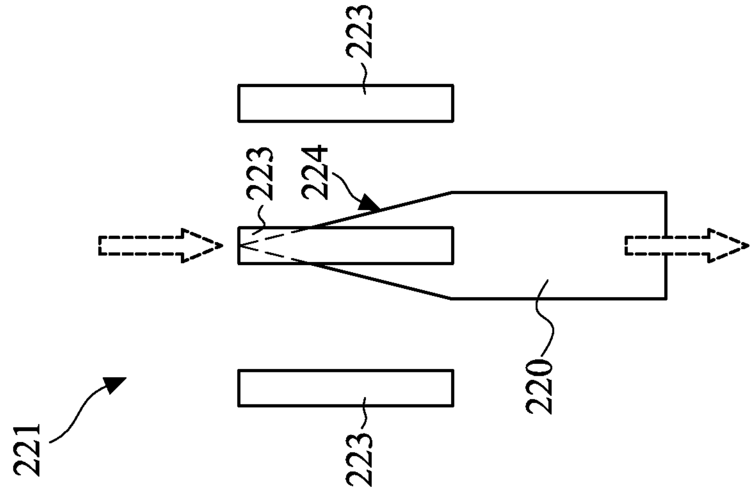
Figure 15A:
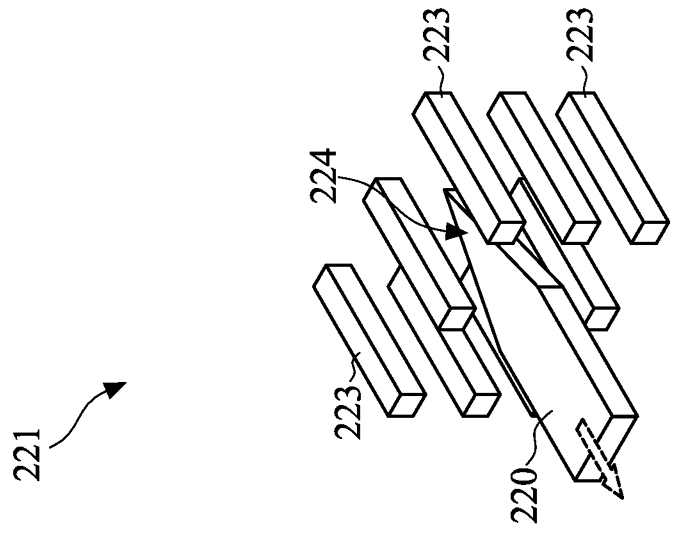

FIGS. 15A-15C illustrate various views of a "multicore" edge coupler 221, in accordance with some embodiments. The edge coupler 221 may be similar to the edge coupler 221 illustrated in FIGS. 13-14. FIG. 15A illustrates a three-dimensional view, FIG. 15B illustrates a plan view, and FIG. 15C illustrates an end view. As shown in FIGS. 15A-15B, the edge coupler 221 may comprise a plurality of cores 223 disposed around a tapered portion 224, in some embodiments. The tapered portion 224 may be continuous with a waveguide 220 and facilitates coupling of light into that waveguide 220.

In an embodiment, the plurality of cores 223 is formed using materials or techniques similar to those used to form the waveguides 220. For example, a core material such as silicon nitride may be deposited and patterned. In the embodiment shown in FIGS. 15A-15C, the edge coupler 221 has eight cores 223 arranged in three levels. The lower level has three cores 223 aligned with each other, the middle level has two cores 223 aligned with each other, and the upper level has three cores 223 aligned with each other, in a "3-2-3" configuration. Additionally, each of the cores 223 are aligned with other cores 223 located in a same column. In the embodiment shown in FIGS. 15A-15C, the individual cores 223 have the same dimensions, though in other embodiments the individual cores 223 may be formed having different dimensions. The edge coupler 221 shown in FIGS. 15A-15C is an illustrative example, and any suitable numbers, levels, arrangements, configurations, sizes, spacing, or dimensions of cores 223 may be utilized in other embodiments.

By utilizing multiple cores 223 within an edge coupler 221 as described, the light received by the multiple cores 223 is reshaped by the multiple cores 223 in a manner that facilitates coupling of the light into the tapered portion 224 and into the waveguide 220. This can allow for improved optical coupling from externally received light into the waveguide 220. Additionally, for light transmitted externally from the waveguide 220, the light received by the tapered portion 224 is coupled to each of the individual cores 223 that surround the tapered portion 224. The multiple cores 223 reshape the wavefront of the light in a manner that can allow for longer distance transmission and more efficient coupling to external optical features (e.g., a mirror, an optical fiber, another edge coupler, etc.). In this manner, the use of a multicore edge coupler as described herein can allow for improved transmission of light between a waveguide and an external optical feature.

Figure 16A:
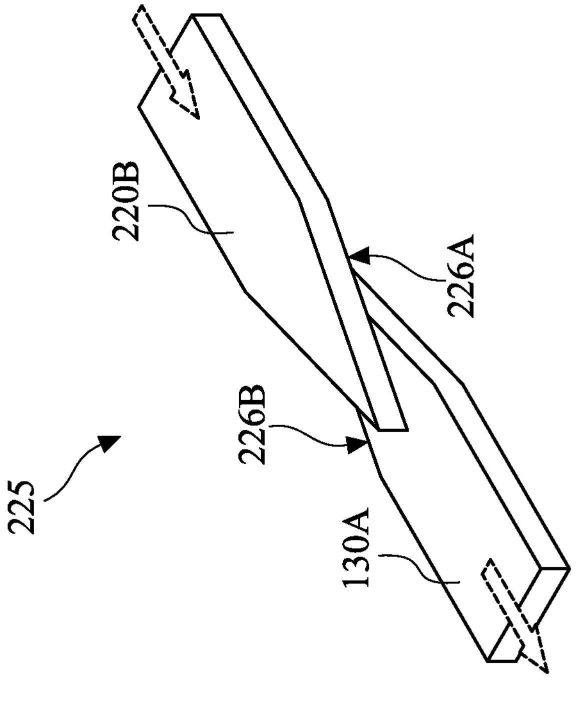
FIGS. 16A and 16B illustrate various views of an evanescent coupling, in accordance with some embodiments.
Figure 16B:
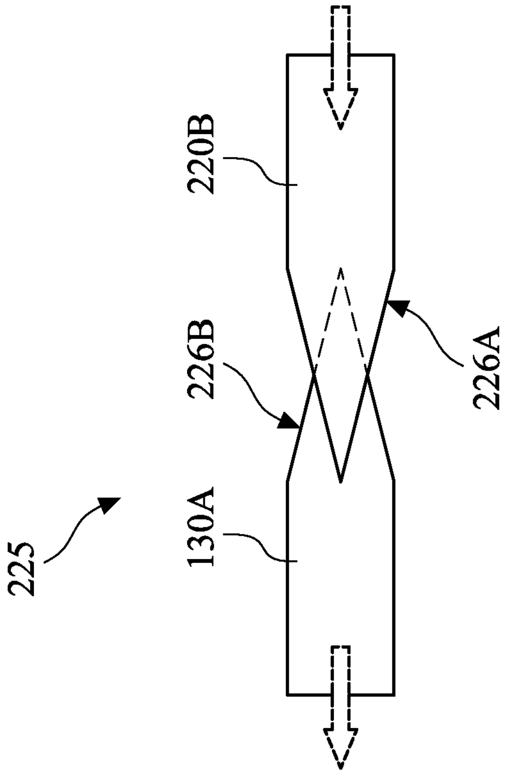

FIGS. 16A and 16B illustrate, respectively, a three-dimensional view of an evanescent coupling 225 and a plan view of an evanescent coupling 225, in accordance with some embodiments. The evanescent coupling 225 shown in FIGS. 16A-16B is described with reference to the evanescent coupling 225 indicated in FIG. 14. For example, the evanescent coupling 225 may allow optical signals and/or optical power to be transmitted between the waveguide 220B and the underlying waveguide 130A. Other evanescent couplings between other pairs of waveguides (e.g., waveguides 220, waveguides 130, and/or waveguides 104) may be similar to the evanescent coupling 225 shown in FIGS. 16A-16B. Other evanescent couplings are possible, and may have other dimensions, configurations, or arrangements in other embodiments.

As shown in FIGS. 16A-16B, the evanescent coupling 225 comprises a tapered portion 226A coupled to the waveguide 220B that overlies a tapered portion 226B of the waveguide 130A. The tapered portion 226A may be continuous with the waveguide 220B, and the tapered portion 226B may be continuous with the waveguide 130A. The tapered portion 226B is directly under and overlapped by the tapered portion 226A. The tapered portions 226A-B may facilitate coupling efficiency between the waveguides 220B and 130A. The tapered portions 226A-B shown in FIGS. 16A-16B are examples, and tapered portions of evanescent couplings may have other angles, widths, lengths, or profiles in other embodiments. The vertical separation between the tapered portion 226B and the tapered portion 226A is small enough that evanescent coupling occurs between the waveguide 220B and the waveguide 130A at the tapered portions 226A-B. For example, the tapered portions 226A-B may be separated by one or more dielectric layers such as insulating layers 117, dielectric layers 202, or the like.

Figure 17:
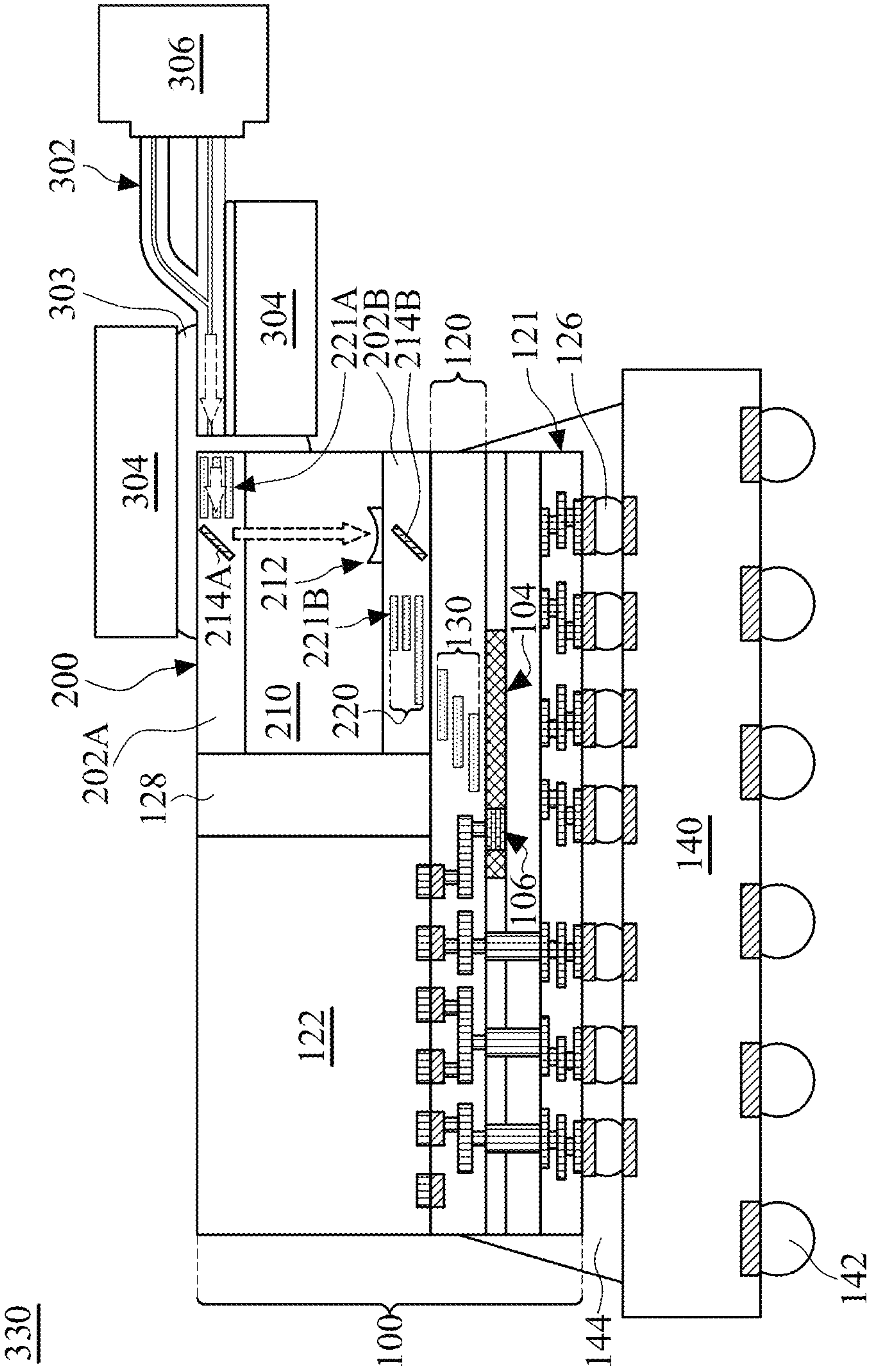
FIGS. 17, 18, and 19 illustrate photonic packages, in accordance with some embodiments.

FIG. 17 illustrates a photonic package 330, in accordance with some embodiments. The photonic package 330 is similar to the photonic package 320 of FIG. 13, except that light is coupled into the coupling structure 200 using an edge coupler 221A and a mirror 214A. The coupling structure 200 of FIG. 17 is similar to the coupling structure 200 of FIG. 13, except that dielectric layers 202A are formed on a top side of the coupling substrate 210 in addition to the dielectric layers 202B on a bottom side of the coupling substrate 210, and that an edge coupler 221A and a mirror 214A are formed in the dielectric layers 202A in addition to the edge coupler 221B and mirror 214B formed in the dielectric layers 202B. The coupling structure 200 shown in FIG. 17 includes one lens 212 formed on a bottom side of the coupling substrate 210, but in other embodiments a lens may also be formed on a top side of the coupling substrate 210.

As shown in FIG. 17, an optical fiber 302 may be attached to the photonic package 330. The optical fiber 302 may be aligned to the edge coupler 221A such that light from the optical fiber 302 is optically coupled into the edge coupler 221A. The light from the optical fiber 302 is directed toward the mirror 214A by the edge coupler 221A, and the mirror 214A redirects the light toward the mirror 214B. The mirror 214B redirects the light into the edge coupler 221B, similar to the photonic package 320 of FIG. 13. In some embodiments, the optical fiber 302 may include one or more optical fibers and may be attached to an optical connector 306. The optical connector 306 may be, for example, an optical component such as an optical fiber, an MT ferrule, a fiber array (e.g., a fiber array unit), an MPO connector, an MTP connector, a fiber cable, or the like. Other types of optical connectors 306 are possible. In some embodiments, the optical fiber 302 and/or the optical connector 306 may be secured by supports 304 and/or an optical adhesive 303.

Figure 18:
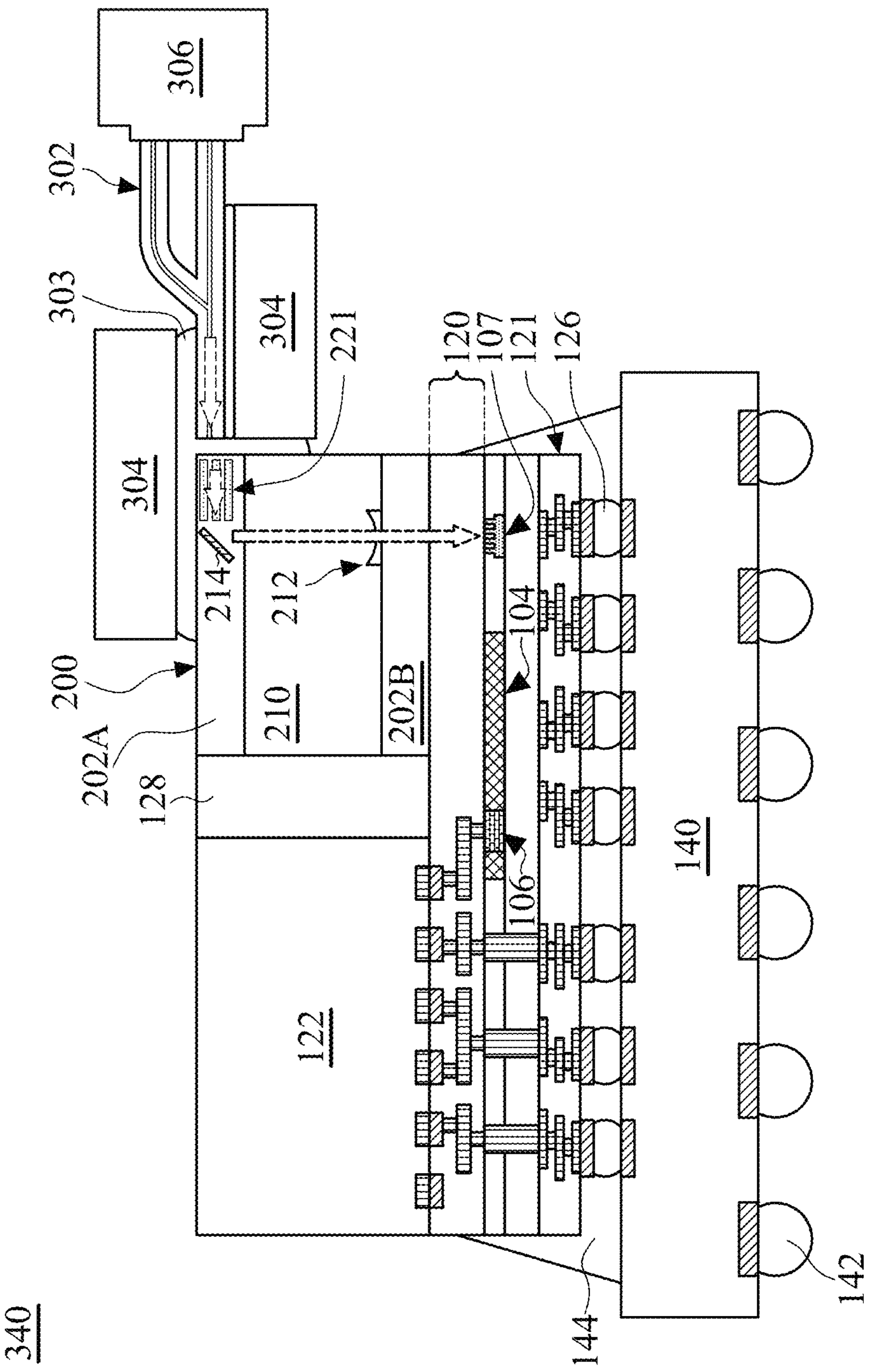

FIG. 18 illustrates a photonic package 340, in accordance with some embodiments. The photonic package 340 is similar to the photonic package 300 of FIG. 10, except that light is coupled into the grating coupler 107 using an edge coupler 221 and a mirror 214. The coupling structure 200 of FIG. 18 is similar to the coupling structure 200 of FIG. 17, except that no edge couplers, waveguides, or mirror are formed in the dielectric layers 202B. For example, the coupling structure 200 of FIG. 18 includes an edge coupler 221 and a mirror 214 formed in the dielectric layers 202A, and the edge coupler 221 may be optically coupled to an optical fiber 302. The coupling structure 200 shown in FIG. 18 includes one lens 212 formed on a bottom side of the coupling substrate 210, but in other embodiments a lens may also be formed on a top side of the coupling substrate 210.

As shown in FIG. 18, an optical fiber 302 may be attached to the photonic package 340. The optical fiber 302 may be aligned to the edge coupler 221 such that light from the optical fiber 302 is optically coupled into the edge coupler 221. The light from the optical fiber 302 is directed toward the mirror 214 by the edge coupler 221, and the mirror 214 redirects the light toward the grating coupler 107. In some embodiments, the optical fiber 302 may include one or more optical fibers and may be attached to an optical connector 306. In some embodiments, the optical fiber 302 and/or the optical connector 306 may be secured by supports 304 and/or an optical adhesive 303.

Figure 19:
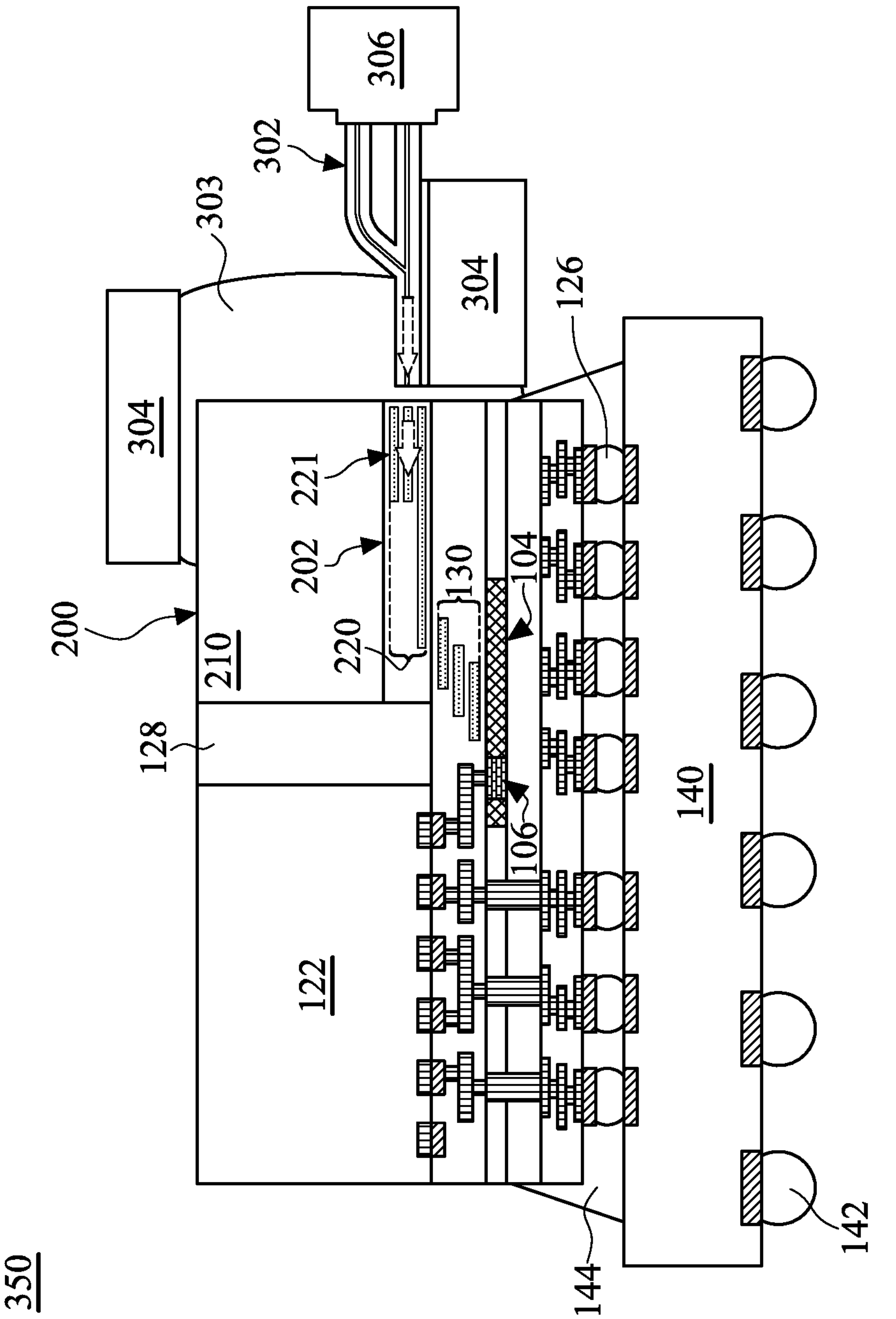

FIG. 19 illustrates a photonic package 350, in accordance with some embodiments. The photonic package 350 is similar to the photonic package 320 of FIG. 13, except that light from an optical fiber 302 is coupled into the waveguides 130 using an edge coupler 221 formed on a bottom side of the coupling substrate 210. The coupling structure 200 of FIG. 19 is similar to the coupling structure 200 of FIG. 13, except that no mirrors or lenses are present, and the edge coupler 221 is configured to receive light directly from an adjacent optical fiber 302.

As shown in FIG. 19, an optical fiber 302 may be attached to the photonic package 350. The optical fiber 302 may be aligned to the edge coupler 221 such that light from the optical fiber 302 is optically coupled into the edge coupler 221. The light from the optical fiber 302 is coupled into a waveguide 220 by the edge coupler 221, and the light is coupled from the waveguide 220 into the waveguides 130 (e.g., through an evanescent coupling). In some embodiments, the optical fiber 302 may include one or more optical fibers and may be attached to an optical connector 306. In some embodiments, the optical fiber 302 and/or the optical connector 306 may be secured by supports 304 and/or an optical adhesive 303.

Figure 20:
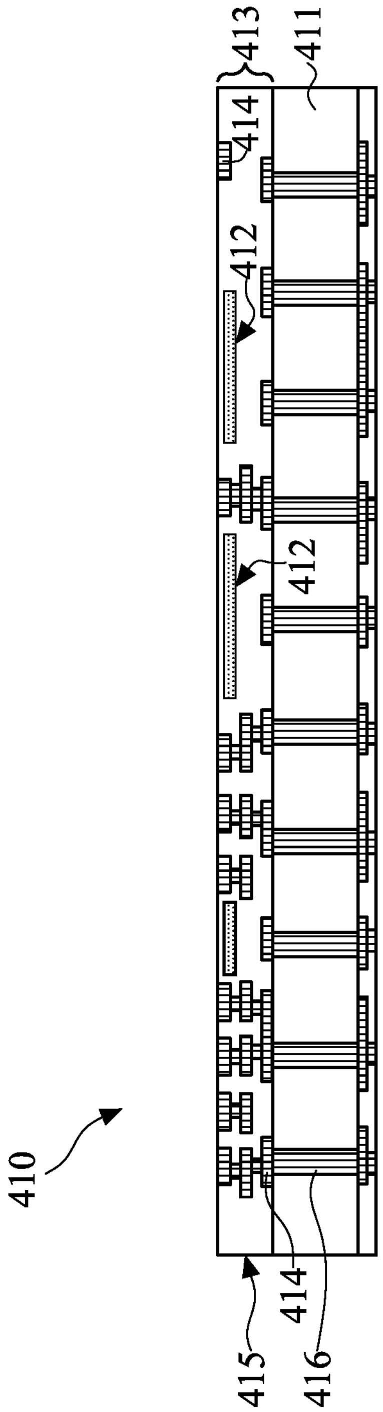
FIG. 20 illustrates an interposer, in accordance with some embodiments.

FIG. 20 illustrates an interposer 410, in accordance with some embodiments. The interposer 410 comprises a substrate 411, an interconnect structure 413 on the substrate 411, and through vias 416, in accordance with some embodiments. The substrate 411 may be a semiconductor substrate (e.g., a silicon wafer) or another type of substrate, such as those described previously for the substrate 102C or the package substrate 140. Other substrates are possible. The through vias 416 extend through the substrate 411 and are electrically connected to the interconnect structure 413.

The interconnect structure 413 comprises one or more layers of conductive features 414 formed in one or more dielectric layers 415. The conductive features 414 may include conductive lines, conductive vias, conductive pads, or the like, which may be formed using any suitable technique such as damascene, dual damascene, or the like, or using techniques described previously. Additionally, the interconnect structure comprises one or more waveguides 412. The waveguides 412 may be formed near a top surface of the interconnect structure 413, in some embodiments. The waveguides 412 may be formed of silicon, silicon nitride, or another suitable material, and may be formed using any suitable technique, such as techniques described previously.

Figure 21:
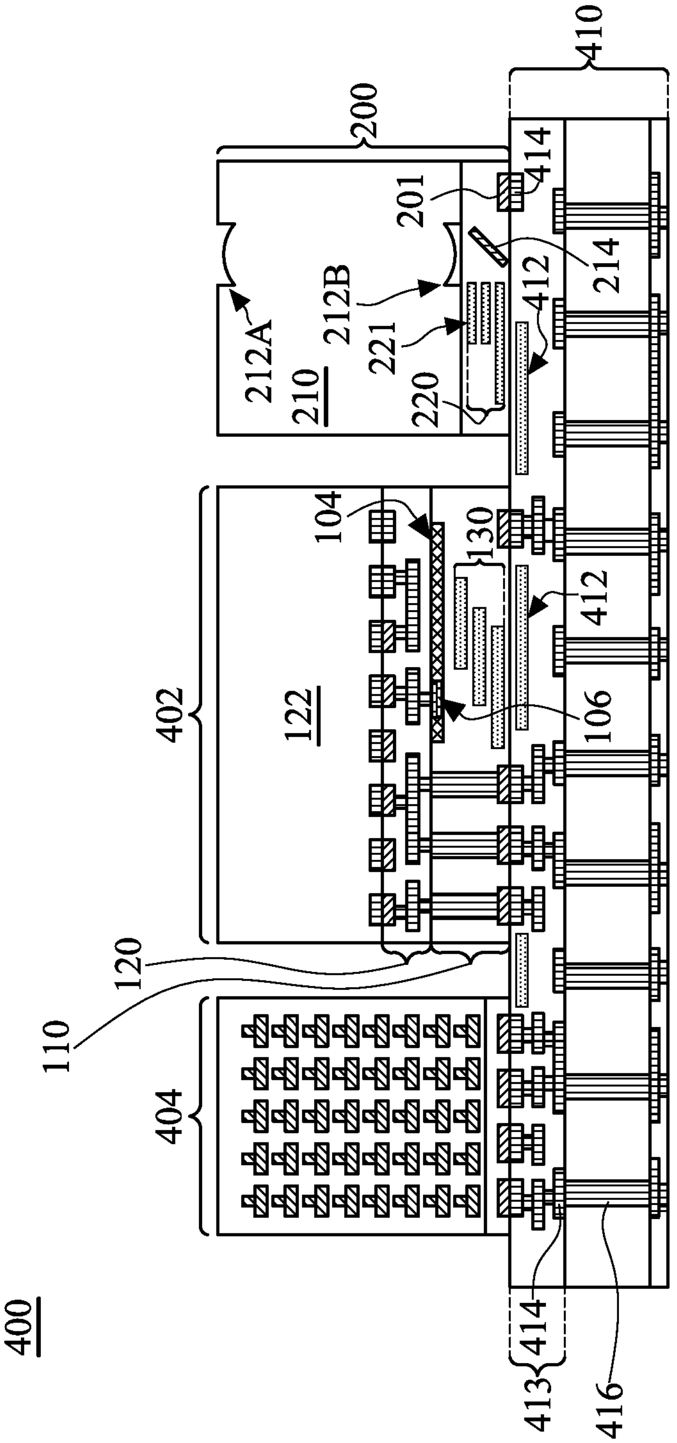
FIGS. 21, 22, and 23 illustrate intermediate steps in the formation of a photonic package, in accordance with some embodiments.

In FIG. 21, an optical engine 402, a coupling structure 200, and an electronic die 404 are bonded to the interposer 410, in accordance with some embodiments. The optical engine 402, the coupling structure 200, and the electronic die 404 may be bonded to the interposer 410 using dielectric-to-dielectric bonding, metal-to-metal bonding, or a combination thereof (e.g., hybrid bonding or the like). For example, bonding surfaces of the optical engine 402, the coupling structure 200, and the electronic die 404 may be bonded to a topmost dielectric layer 415 of the interconnect structure 413 using dielectric-to-dielectric bonding, and conductive pads of the optical engine 402, the coupling structure 200, and/or the electronic die 404 may be bonded to conductive pads of the interconnect structure 413 using metal-to-metal bonding. The electronic die 404 may be a semiconductor die or the like such as those described previously for the electronic die 122. For example, in some embodiments, the electronic die 404 may be a high bandwidth memory module (HBM), an application-specific integrated circuit (ASIC), or another type of electronic die. In other embodiments, different numbers, configurations, or arrangements of optical engines 402, coupling structures 200, or electronic dies 404 may be bonded to the interposer 410.

The optical engine 402 may be similar to the optical engine 100 described previously for FIG. 13, except that the coupling structure 200 is not part of the optical engine 402, conductive connectors 126 are not formed on the optical engine 402, and the waveguides 130 are formed underneath the waveguides 104 in the photonic routing structure 110 rather than in the redistribution structure 120. One or more waveguides 130 may be optically coupled to one or more waveguides 412 through, for example, evanescent coupling. In some embodiments, the electronic die 122, the photonic routing structure 110, and the redistribution structure 120 have the same width, as shown in FIG. 21. In some embodiments, multiple optical engines 402 are formed on a single wafer or substrate and then singulated into separate optical engines 402.

The coupling structure 200 of FIG. 21 may be similar to the coupling structure 200 of FIG. 13, in some embodiments. For example, the coupling structure 200 may include a mirror 214 that redirects light into an edge coupler 221 that couples the light into a waveguide 220. The waveguide 220 may be optically coupled to a waveguide 412 through, for example, evanescent coupling.

Figure 22:
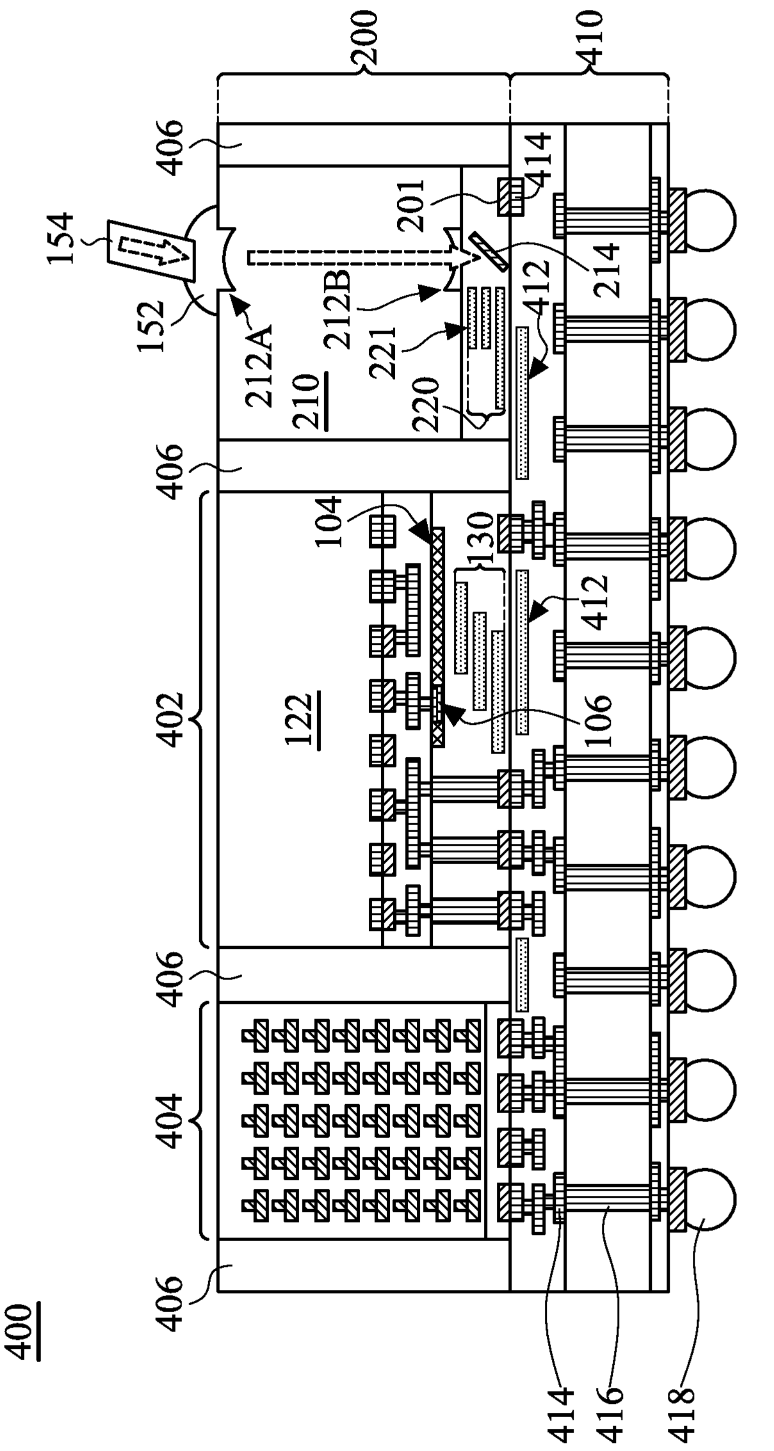

In FIG. 22, an encapsulant 406 is deposited over the interposer 410 to form a photonic package 400, in accordance with some embodiments. An optical fiber 154 may be attached to the coupling structure 200 over a lens 212A, similar to the photonic package 320 of FIG. 13. In this manner, light from an optical fiber 154 may be coupled into the optical engine 402 through the interposer 410.

The encapsulant 406 may surround or partially surround the optical engines 402, the coupling structures 200, and/or the electronic dies 404. In some embodiments, a planarization process (e.g., a CMP process or grinding process) may be performed to remove excess encapsulant 406, which may expose top surfaces of the optical engine 402, the coupling structure 200, and/or the electronic die 404. In some embodiments, top surfaces of the encapsulant 406, the optical engine 402, the coupling structure 200, and/or the electronic die 404 may be level after performing the planarization process. In some embodiments, conductive connectors 418 may be formed on the interposer 410. The conductive connectors 418 may be similar to the conductive connectors 126 or the conductive connectors 142 described previously.

Figure 23:
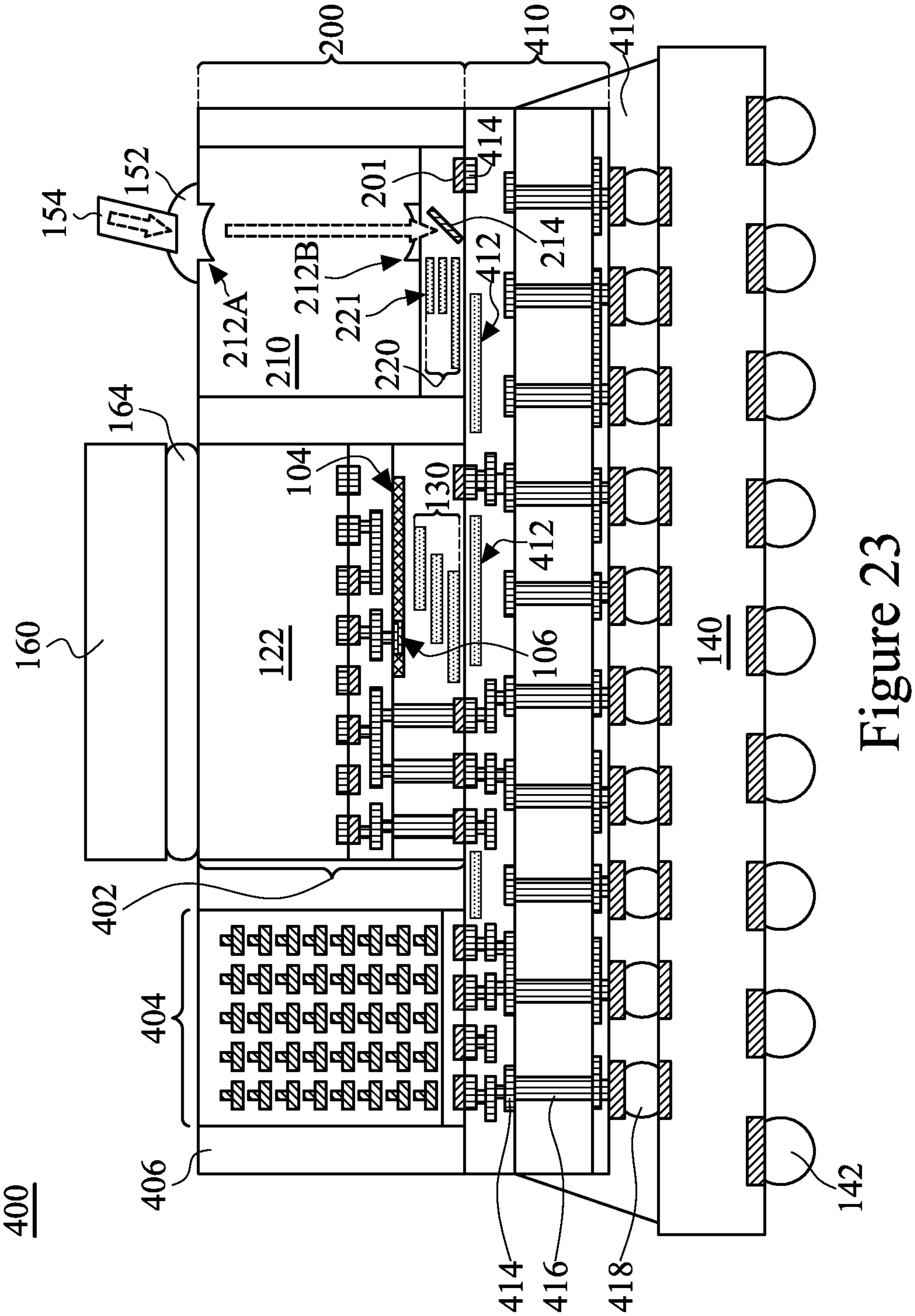

In some embodiments, the photonic package 400 may optionally be attached to a package substrate 140, as shown in FIG. 23. The package substrate 140 may be similar to the package substrate 140 described previously for FIG. 10. For example, the conductive connectors 418 may be placed on corresponding conductive pads of the package substrate 140 and then a reflow process is performed to bond the photonic package 400 to the package substrate 140. An underfill 419 may be deposited between the photonic package 400 and the package substrate 140. Other photonic packages described herein may be attached to a package substrate, in other embodiments.

Further in FIG. 23, one or more optional heat dissipation structures 160 may be attached to the photonic package 400, in accordance with some embodiments. The heat dissipation structure 160 may be attached to heat-generating portions of the photonic package 400, such as the electronic die 122 or the electronic die 404. In some embodiments, a thermal material 164 (e.g., a TIM, heat sink compound, or the like) may be deposited underneath the heat dissipation structure 160. Other photonic packages described herein may have one or more heat dissipation structures, in other embodiments.

Figure 24:
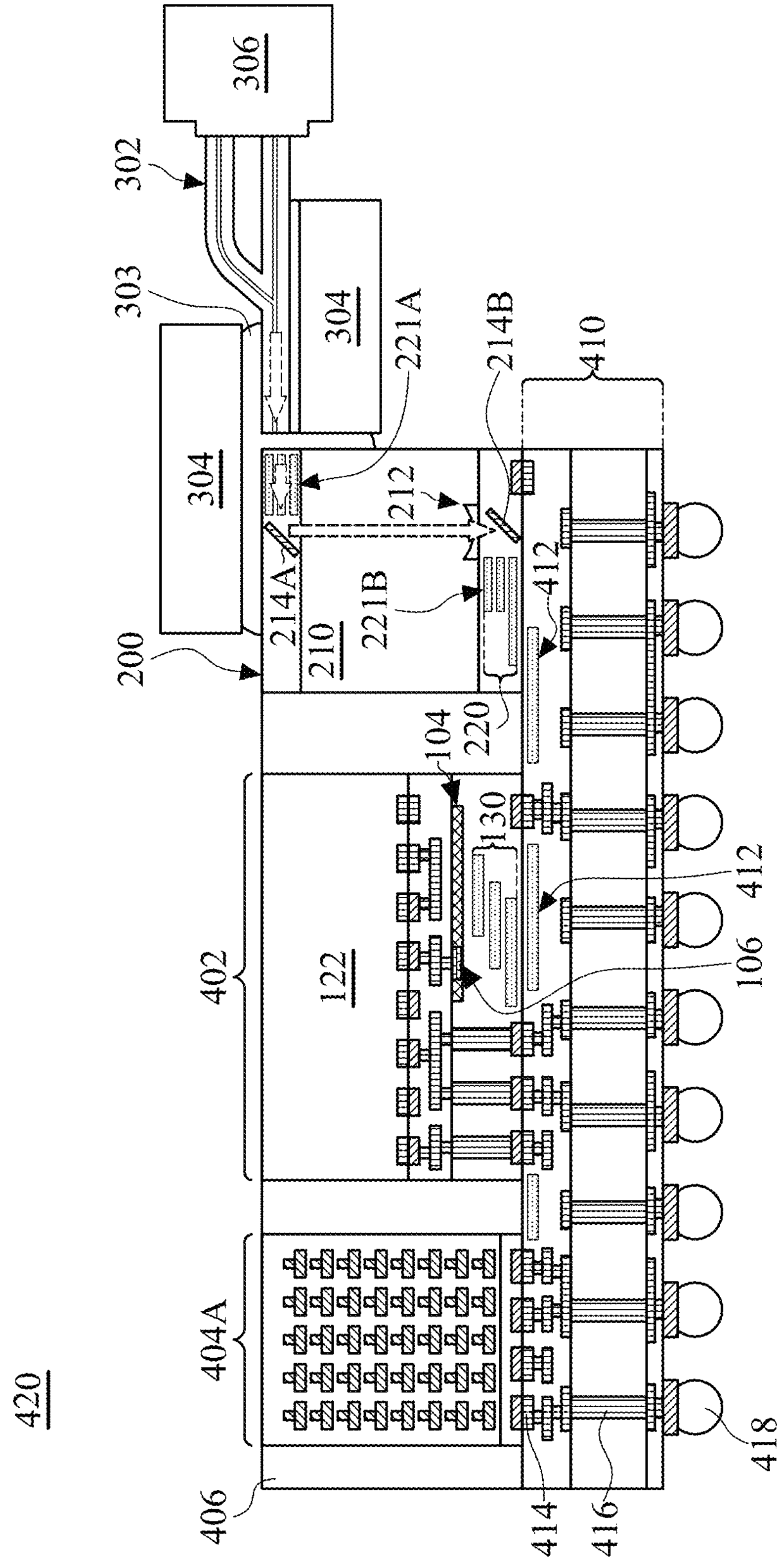
FIGS. 24 and 25 illustrate photonic packages, in accordance with some embodiments.

FIG. 24 illustrates a photonic package 420, in accordance with some embodiments. The photonic package 420 is similar to the photonic package 400 of FIG. 22, except that light from an optical fiber 302 is coupled into the waveguides 130 using an edge coupler 221A formed on a top side of the coupling substrate 210. The coupling structure 200 of FIG. 24 is similar to the coupling structure 200 of FIG. 17.

Figure 25:
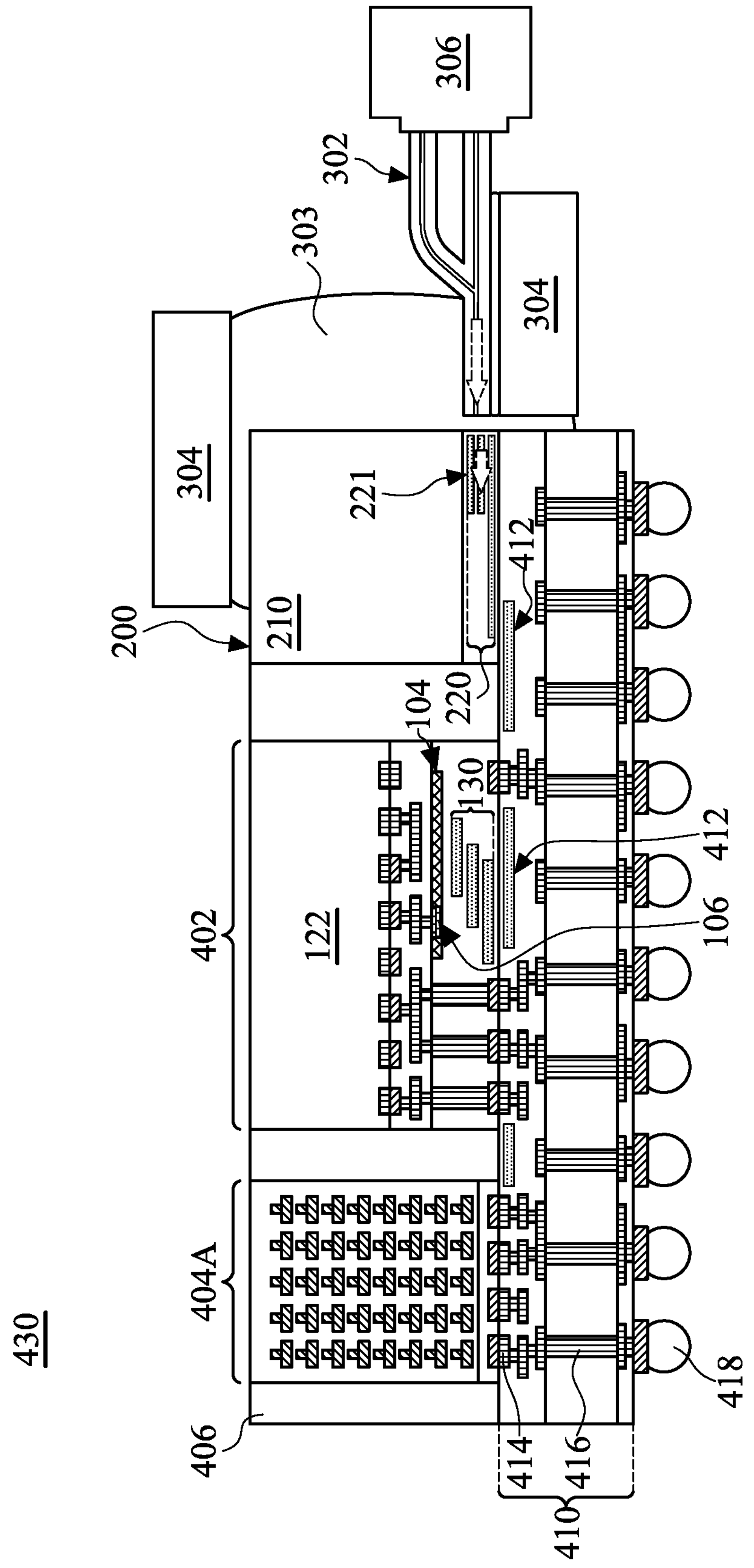

FIG. 25 illustrates a photonic package 430, in accordance with some embodiments. The photonic package 430 is similar to the photonic package 400 of FIG. 22, except that light from an optical fiber 302 is coupled into the waveguides 130 using an edge coupler 221 formed on a bottom side of the coupling substrate 210. The coupling structure 200 of FIG. 25 is similar to the coupling structure 200 of FIG. 19.

Figure 26:
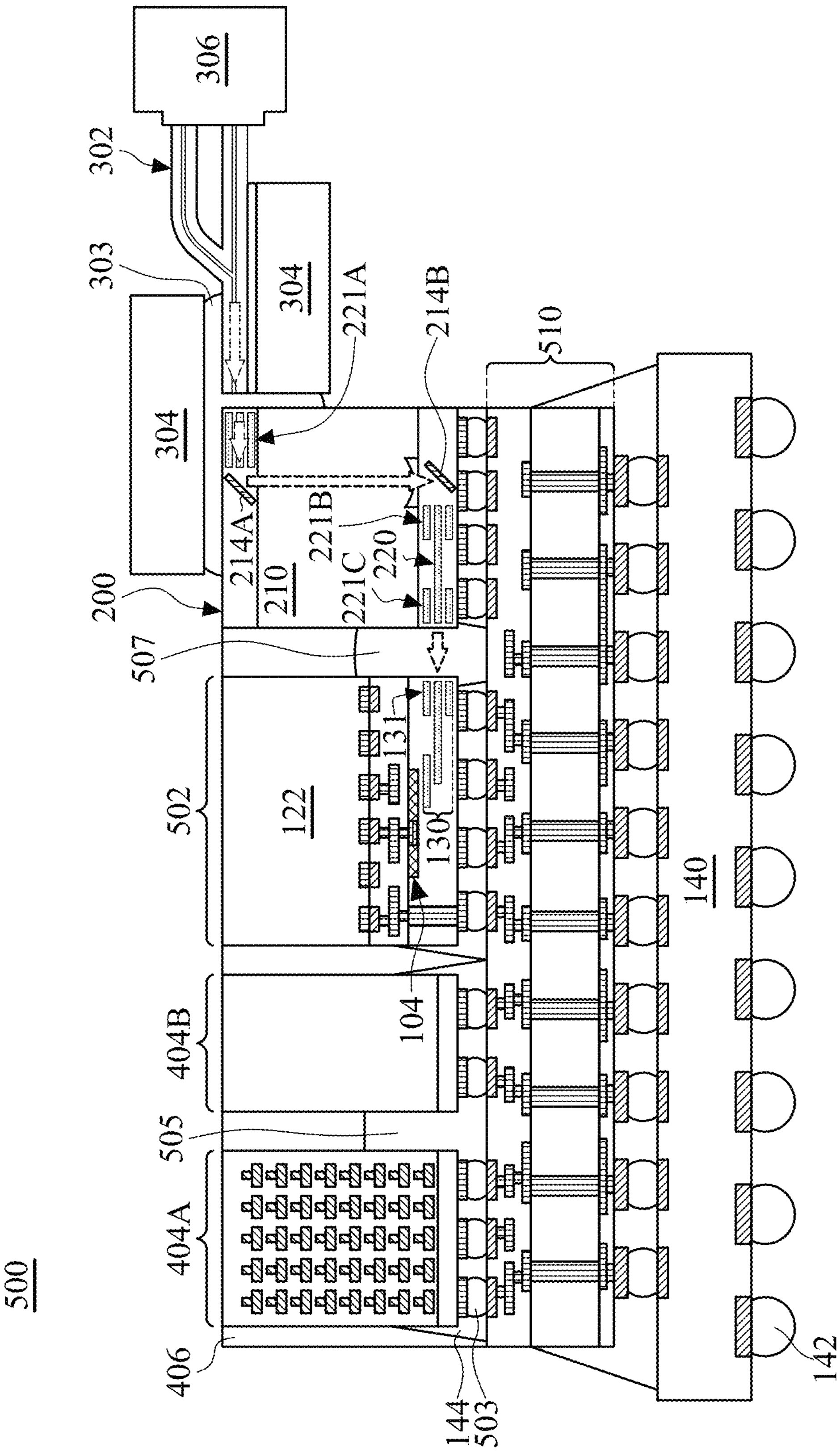
FIG. 26 illustrates a photonic package, in accordance with some embodiments.

FIG. 26 illustrates a photonic package 500, in accordance with some embodiments. The photonic package 500 comprises an interposer 510 connected to an optical engine 502, a coupling structure 200, and multiple electronic dies 404A-B. The interposer 510 may be similar to the interposer 410 of FIG. 20, except that the interconnect structure 513 of the interposer 510 is free of waveguides. The optical engine 502, coupling structure 200, and electronic dies 404A-B may be bonded to the interposer 510 using conductive connectors 503, which may be similar to the conductive connectors 126 described previously. One or more underfill regions 505 may be deposited around the conductive connectors 503, in some embodiments.

The electronic dies 404A-B may be similar to other electronic dies described previously. For example, in some embodiments, the electronic die 404A may be an HBM die and the electronic die 404B may be an ASIC die, though other combinations of electronic dies are possible. The optical engine 502 may be similar to the optical engine 402 described previously for FIG. 22, except that the optical engine 502 includes an edge coupler 131 coupled to a waveguide 130. The edge coupler 131 may be a "multicore" edge coupler similar to the edge coupler 221, in some embodiments.

The coupling structure 200 is similar to the coupling structure 200 of FIG. 17, except that two edge couplers 221B and 221C are formed in the dielectric layers 202B. The edge coupler 221B is configured to receive light from the mirror 214B and couple it into a waveguide 220. The edge coupler 221C is configured to receive light from the waveguide 220 and transmit it externally. For example, the edge coupler 221C of the photonic package 500 is configured to transmit the light from the coupling structure 200 and into the edge coupler 131 of the optical engine 502. In some embodiments, an optical adhesive 507 or the like may be deposited between the optical engine 502 and the coupling structure 200 to facilitate transmission of light between the edge coupler 221C and the edge coupler 131. In this manner, optical signals and/or optical power may be transmitted from an optical fiber 302, through a coupling structure 200, and into an optical engine 502.

Figure 27:
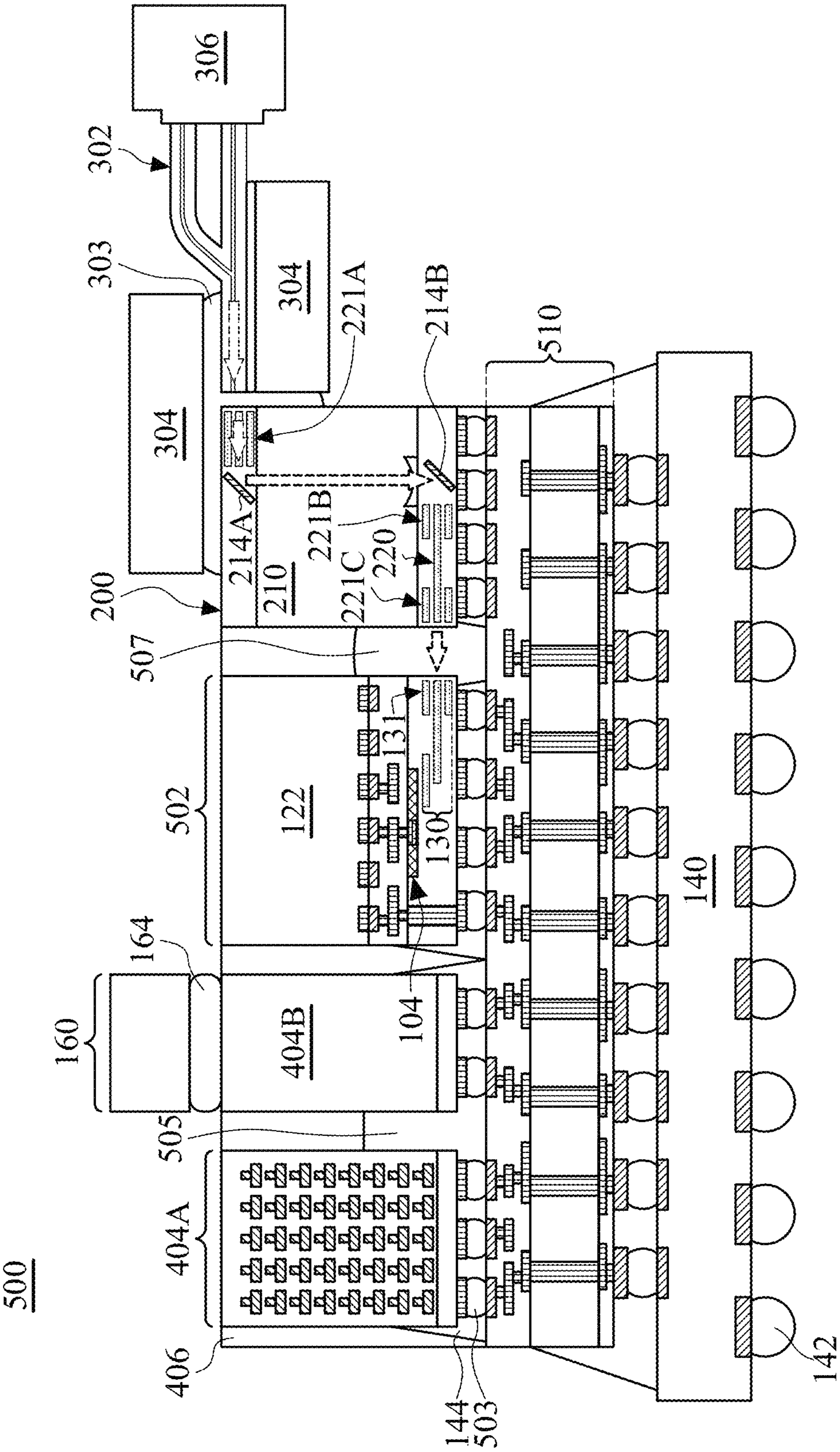
FIG. 27 illustrates a photonic package with a heat dissipation structure, in accordance with some embodiments.

FIG. 27 illustrates a photonic package 500 similar to the photonic package 500 of FIG. 26, except that one or more optional heat dissipation structures 160 are attached to the photonic package 500, in accordance with some embodiments. The heat dissipation structure 160 may be attached to heat-generating portions of the photonic package 500, such as one or more electronic dies 404. In some embodiments, a thermal material 164 (e.g., a TIM, heat sink compound, or the like) may be deposited underneath the heat dissipation structure 160. Other photonic packages described herein may have one or more heat dissipation structures, in other embodiments.

Figure 28:
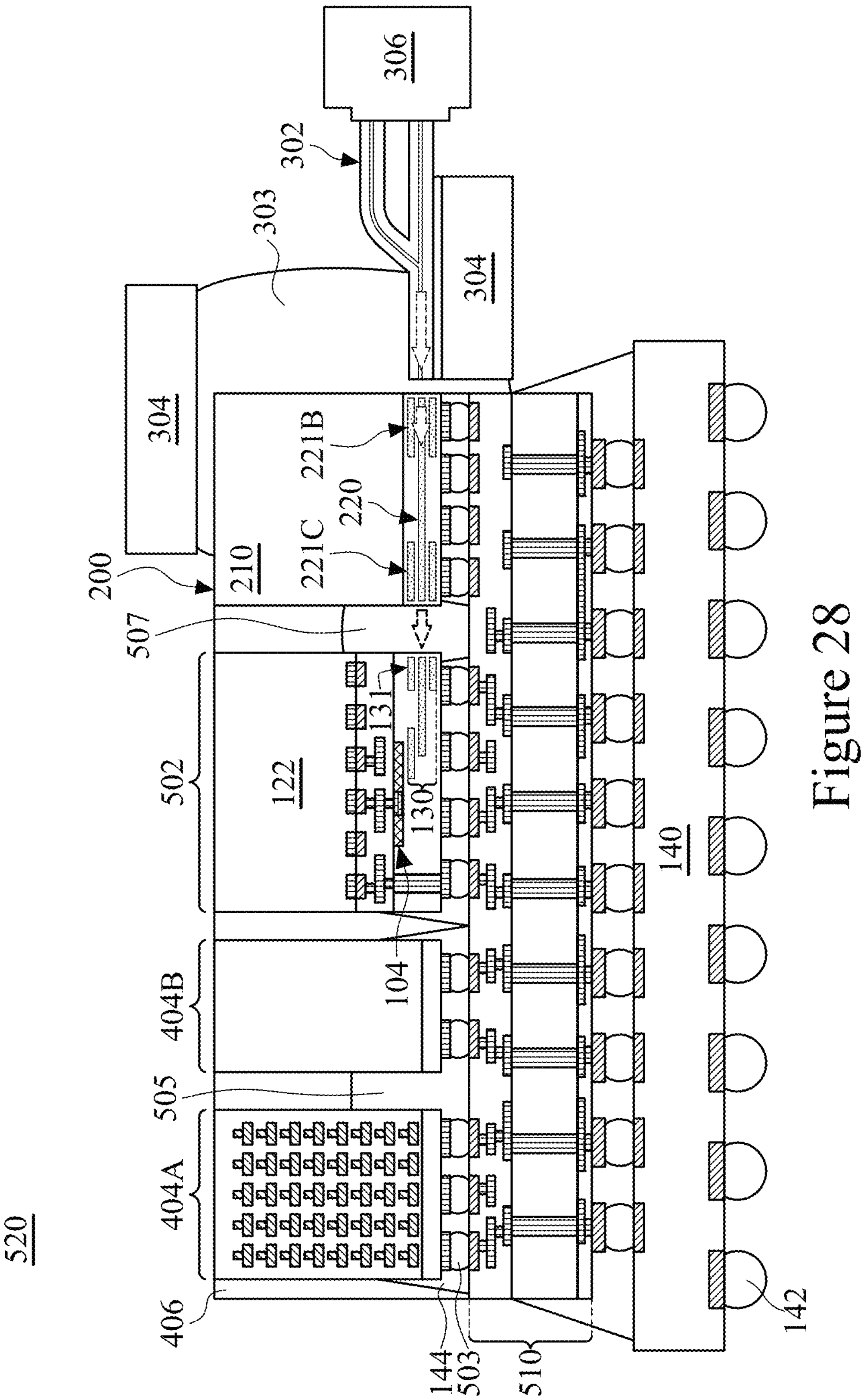
FIGS. 28 and 29 illustrate photonic packages, in accordance with some embodiments.

FIG. 28 illustrates a photonic package 520, in accordance with some embodiments. The photonic package 520 is similar to the photonic package 500 of FIG. 27, except that light from an optical fiber 302 is coupled into the edge coupler 221B formed on a bottom side of the coupling substrate 210 rather than using an edge coupler formed on a top side of the coupling substrate. In this manner, the coupling structure 200 of FIG. 28 is similar to the coupling structure 200 of FIG. 25, except that the coupling structure 200 of FIG. 28 includes an edge coupler 221C that transmits light to the optical engine 502.

Figure 29:
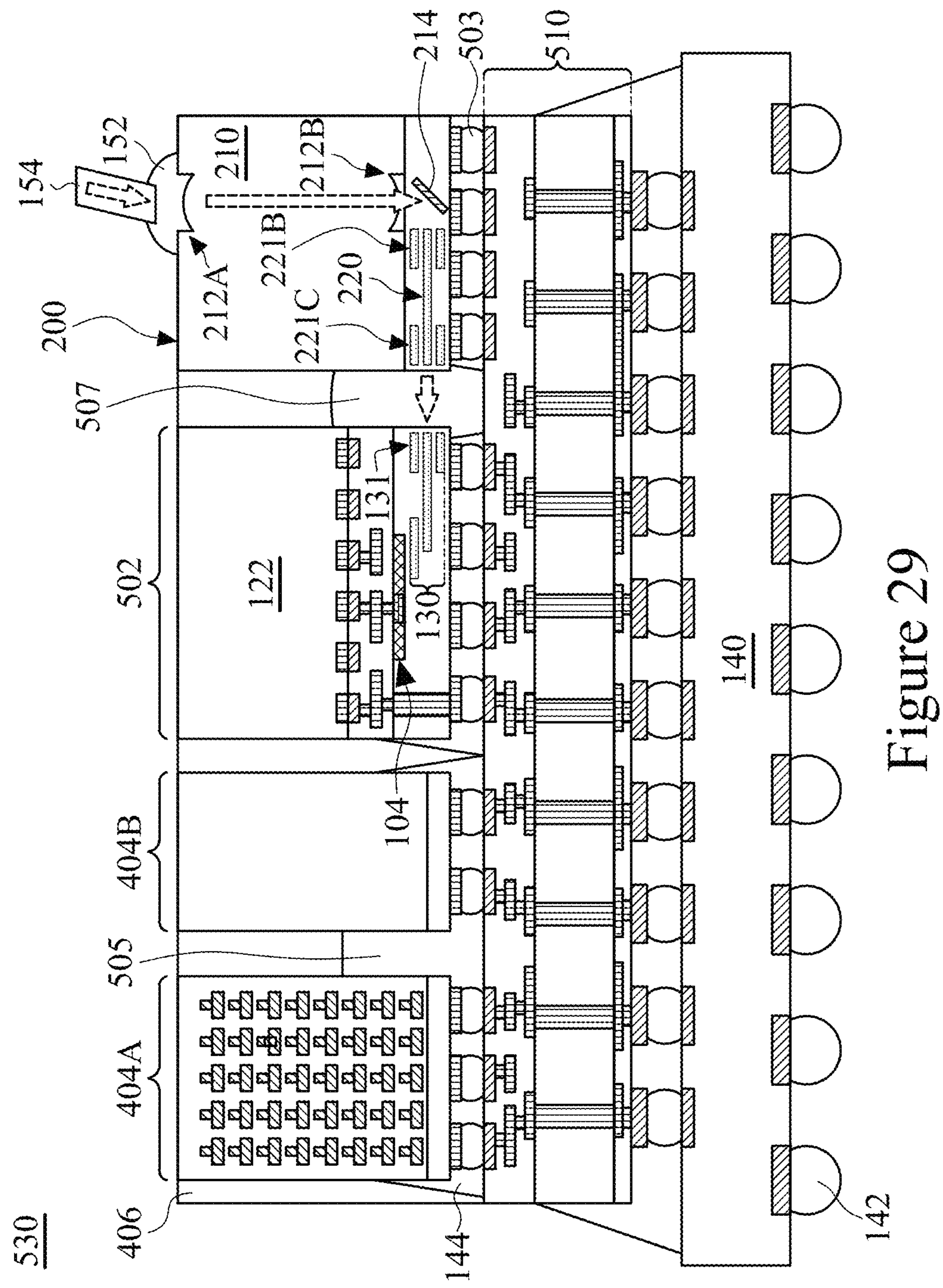

FIG. 29 illustrates a photonic package 530, in accordance with some embodiments. The photonic package 530 is similar to the photonic package 500 of FIG. 27, except that light from an optical fiber 154 is coupled into the edge coupler 221B through a lens formed on a top side of the coupling structure 200. In this manner, the coupling structure 200 of FIG. 29 is similar to the coupling structure 200 of FIG. 22, except that the coupling structure 200 of FIG. 29 includes an edge coupler 221C that transmits light to the optical engine 502.

Figure 30:
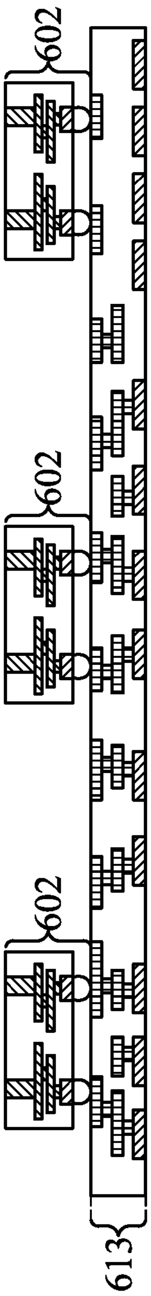
FIGS. 30, 31, and 32 illustrate intermediate steps in the formation of an interposer, in accordance with some embodiments.
Figure 31:
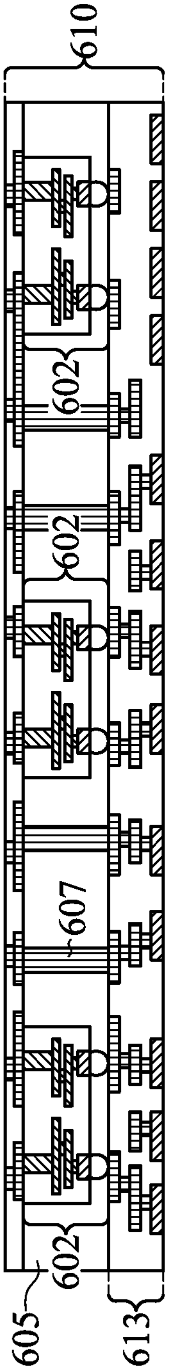
Figure 32:
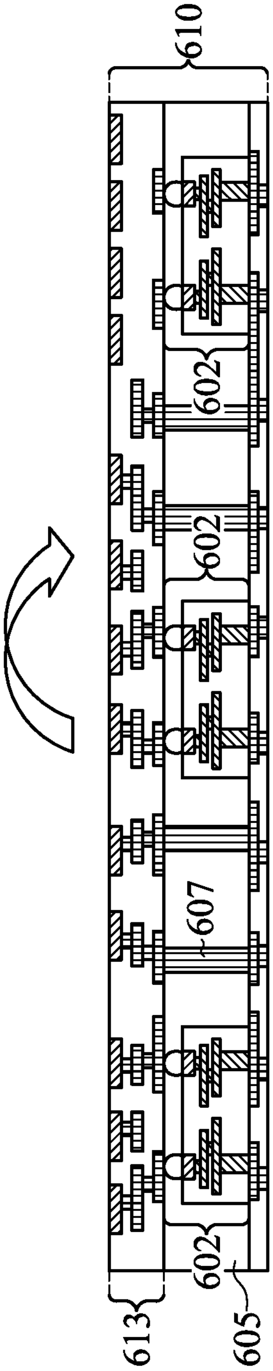

FIGS. 30, 31, and 32 illustrate cross-sectional views of intermediate steps in the formation of an interposer 610, in accordance with some embodiments. The interposer 610 is similar to the interposer 510, except that the interposer 610 includes connection structures 602. The connection structures 602 may provide additional electrical interconnections within the interposer 610. The connection structures 602 may or may not include passive devices or active devices. In some cases, the connection structures 602 may be considered "chips" or "chiplets."

In FIG. 30, one or more connection structures 602 are connected to an interconnect structure 613. The interconnect structure 613 may include conductive features (e.g., conductive lines, vias, pads, or the like) formed in dielectric layers. In some embodiments, the interconnect structure 613 may be similar to the interconnect structure 513 of FIG. 26. The connection structures 602 may comprise conductive connectors (e.g., solder bumps or the like), and may be connected to the interconnect structure 613 by the conductive connectors. The conductive connectors may be similar to the conductive connectors 126 described previously.

In FIG. 31, through vias 607 are formed on the interconnect structure 613, in accordance with some embodiments. An encapsulant 605 may be formed on the interconnect structure 613, and may surround the connection structure 602 and the through vias 607. The through vias 607 may be formed on and may be electrically connected to the interconnect structure 613. In FIG. 32, the interposer 610 is flipped upside-down.

Figure 33:
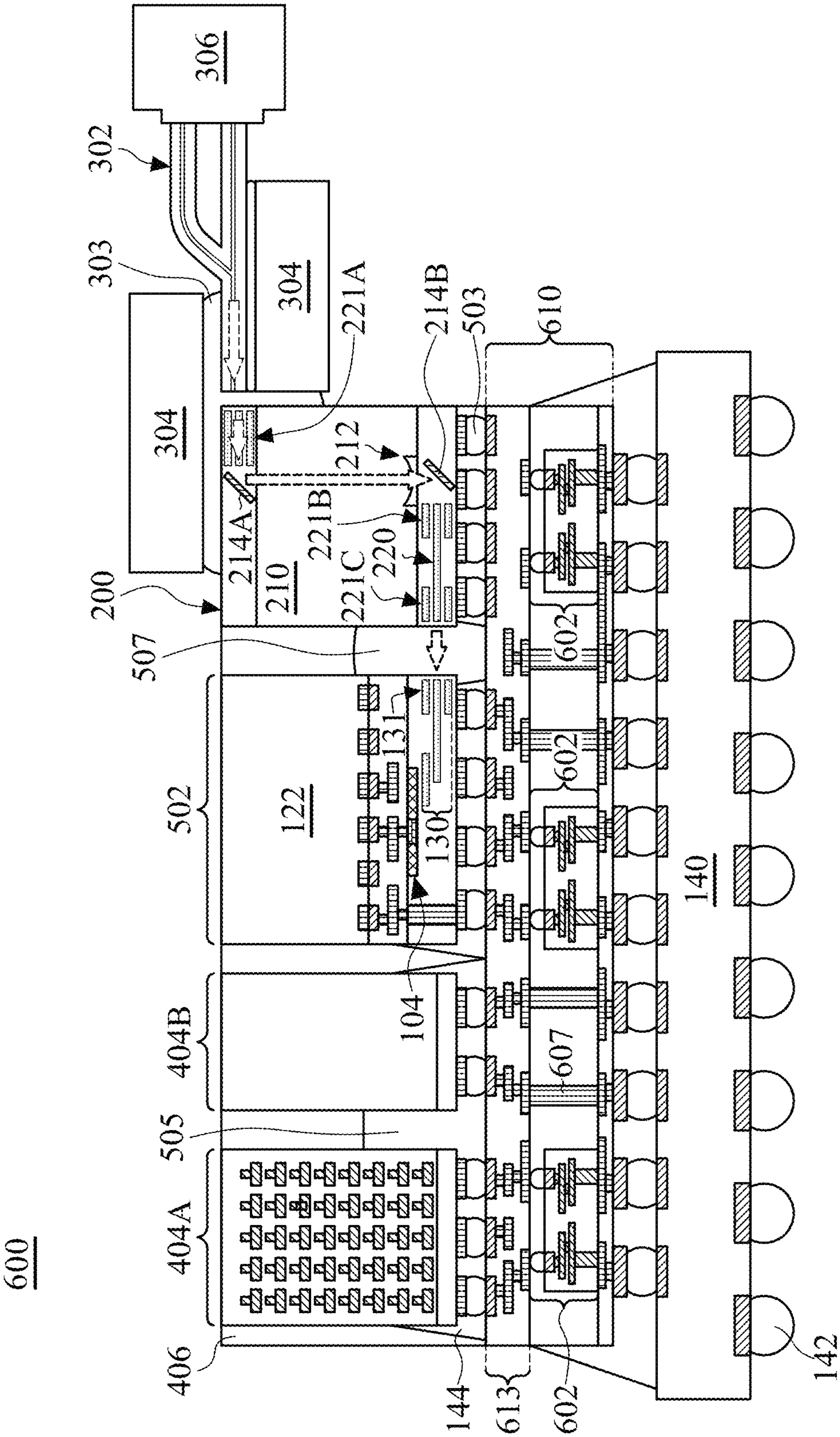
FIGS. 33, 34, and 35 illustrate photonic packages, in accordance with some embodiments.
Figure 34:
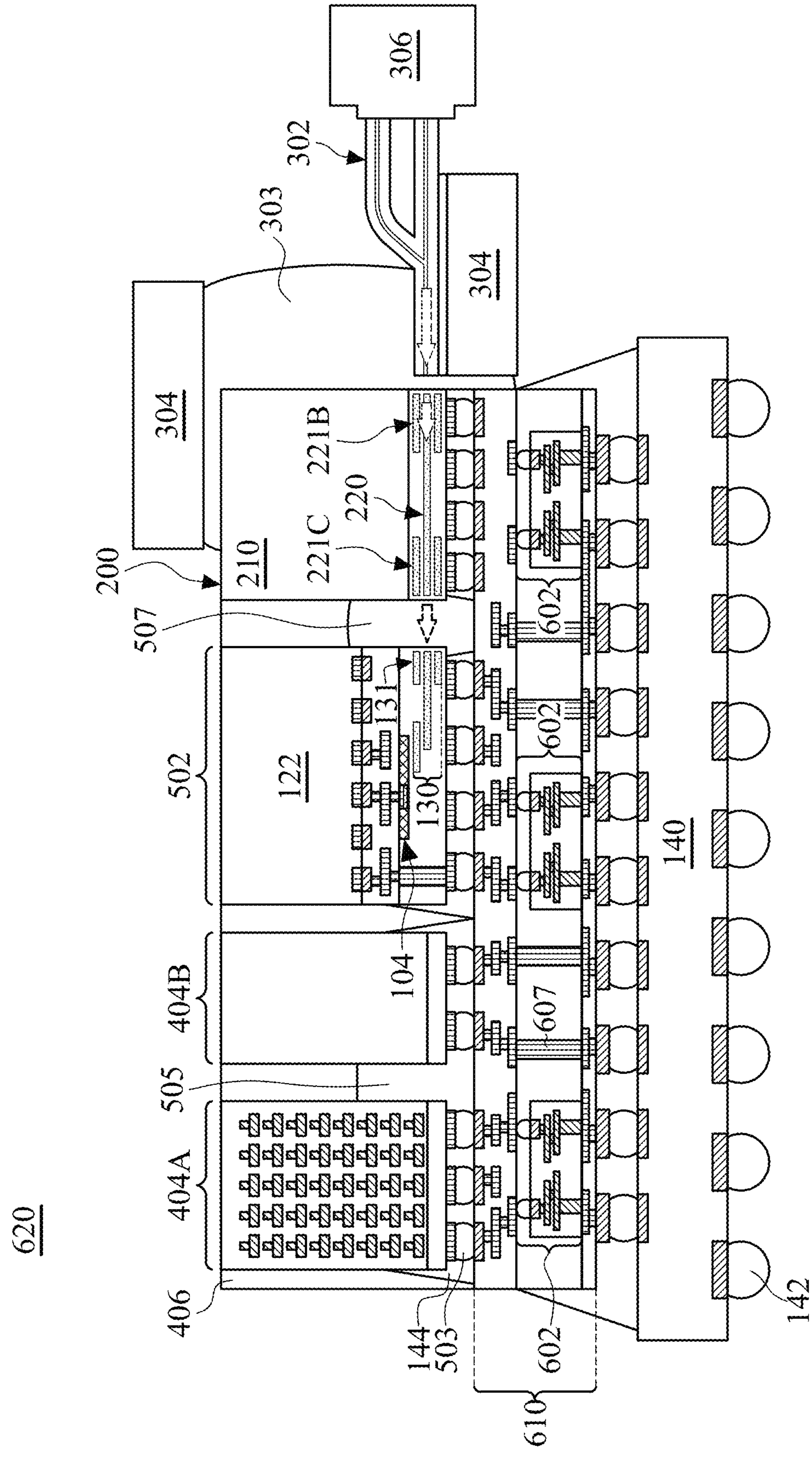
Figure 35:
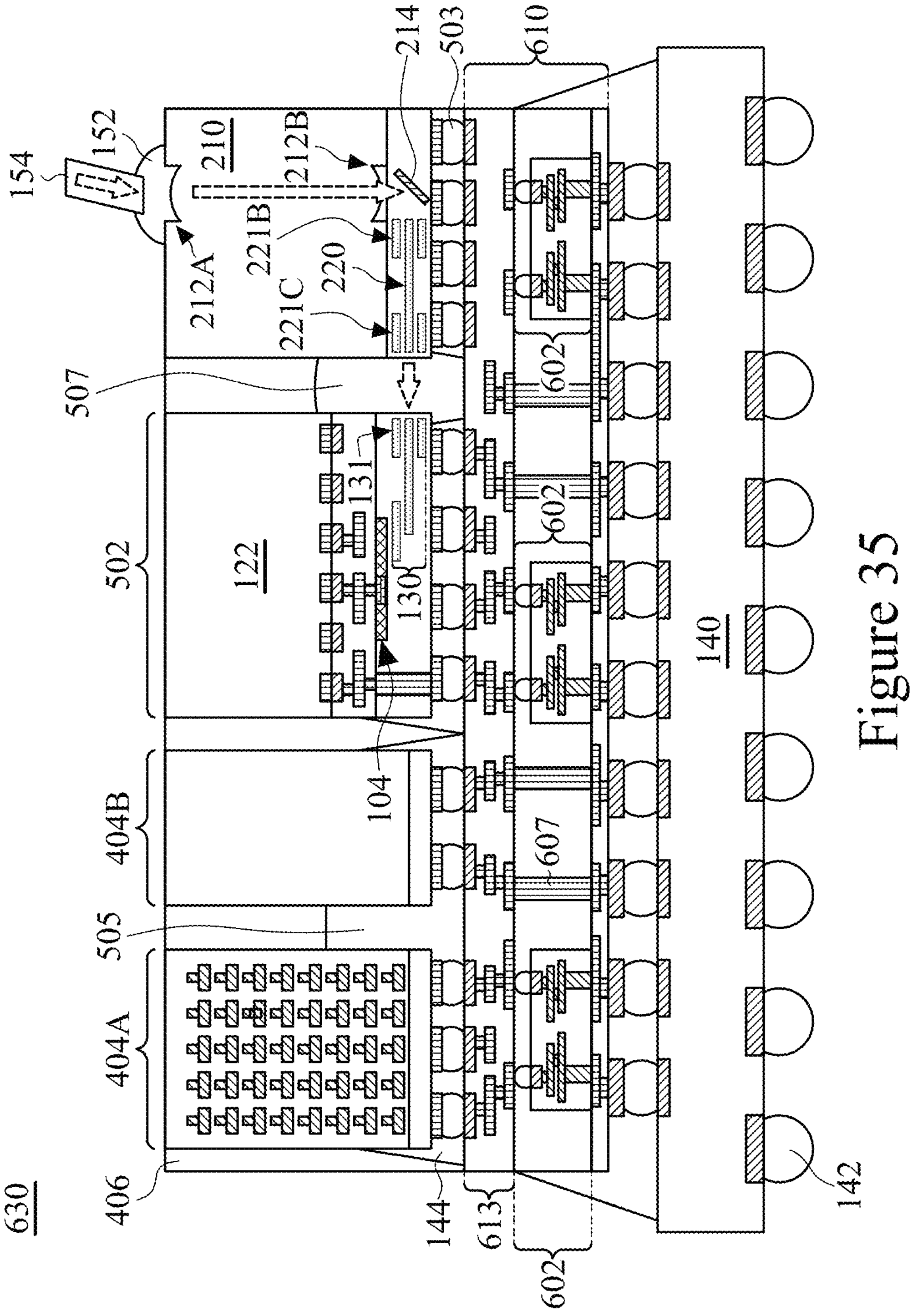

FIG. 33 illustrates a photonic package 600, in accordance with some embodiments. The photonic package 600 is similar to the photonic package 500 of FIG. 26, except that the interposer 610 includes connection structures 602. FIG. 34 illustrates a photonic package 620, in accordance with some embodiments. The photonic package 620 is similar to the photonic package 520 of FIG. 28, except that the interposer 610 includes connection structures 602. FIG. 35 illustrates a photonic package 630, in accordance with some embodiments. The photonic package 630 is similar to the photonic package 530 of FIG. 29, except that the interposer 610 includes connection structures 602.

The embodiments of the present disclosure have some advantageous features. By forming an optical coupling structure as a separate structure incorporated into an optical engine or a photonic package, the optical coupling structure can be aligned separately from the optical engine, which can allow for easier and more efficient alignment. Forming optical coupling structures as separate structures can result in reduced manufacturing cost for an optical engine or a photonic package, in some cases. Forming optical coupling structures separately can also allow for more flexible design for photonic packages. For example, multiple optical coupling structures can be utilized in the same photonic package, and can be arranged or configured for particular applications. Optical coupling structures of different types can be incorporated in the same photonic package. The use of optical coupling structures as described herein can also allow for both vertical attachment of optical fibers and horizontal attachment of optical fibers.

In an embodiment of the present disclosure, a package includes a routing structure including a first waveguide and a photonic device; an electronic die bonded to the routing structure, wherein the electronic die is electrically connected to the photonic device; and an optical coupling structure bonded to the routing structure adjacent the electronic die, wherein the optical coupling structure includes a first lens in a first side of a substrate. In an embodiment, the routing structure includes a grating coupler optically coupled to the first waveguide, wherein the first lens is optically aligned to the grating coupler. In an embodiment, top surfaces of the electronic die and the optical coupling structure are level. In an embodiment, the optical coupling structure is laterally separated from the electronic die by an encapsulant. In an embodiment, the optical coupling structure includes an edge coupler and a mirror, wherein the mirror is configured to direct light into the edge coupler. In an embodiment, the optical coupling structure includes a second waveguide that is optically coupled to the first waveguide. In an embodiment, the second waveguide overlies the first waveguide and is evanescently coupled to the first waveguide. In an embodiment, the optical coupling structure includes a second lens in a second side of the substrate that is opposite the first side.

In an embodiment of the present disclosure, a package includes an interposer that includes conductive lines and first waveguides; an optical engine bonded to the interposer, wherein the optical engine includes a first electronic die and second waveguides, wherein at least one second waveguide is optically coupled to a respective first waveguide; and an optical coupling structure bonded to the interposer adjacent the optical engine, wherein the optical coupling structure comprises a first edge coupler that is optically coupled to a first waveguide of the interposer. In an embodiment, the first edge coupler is configured to receive light from an optical fiber attached to a sidewall of the optical coupling structure. In an embodiment, the optical coupling structure includes a first mirror adjacent the first edge coupler, wherein the first mirror is configured to receive light from above and redirect it into the first edge coupler. In an embodiment, the optical coupling structure includes a second mirror and a second edge coupler, wherein the second mirror is configured to receive light from the second edge coupler and redirect it into the first mirror. In an embodiment, the optical engine and the optical coupling structure are bonded to the interposer using dielectric-to-dielectric bonding. In an embodiment, the package includes a second electronic die bonded to the interposer. In an embodiment, the package includes a heat dissipation structure attached to the optical engine.

In an embodiment of the present disclosure, a method includes forming a waveguide, a photonic component, and a grating coupler on a substrate, wherein the photonic component and the grating coupler are optically coupled to the waveguide; forming a redistribution structure over the waveguide, the photonic component, and the grating, wherein the redistribution structure is electrically coupled to the photonic component; bonding an electronic die to the redistribution structure, wherein the electronic die is electrically coupled to the redistribution structure; placing a dummy die on the redistribution structure, wherein the dummy die includes a lens, wherein placing the dummy die includes aligning the lens to the grating coupler; and bonding the dummy die to the redistribution structure. In an embodiment, the method includes attaching an optical fiber to the dummy die, wherein the optical fiber is optically coupled to the grating coupler through the lens. In an embodiment, the optical fiber is attached to a top surface of the dummy die and directs light into the top surface. In an embodiment, the optical fiber is attached to a sidewall surface of the dummy die and directs light into the sidewall surface. In an embodiment, the method includes attaching the redistribution structure to a package substrate.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A package comprising:

a routing structure comprising a first waveguide and a photonic device;

an electronic die bonded to the routing structure, wherein the electronic die is electrically connected to the photonic device, the electronic die comprising a first side and a second side opposite the first side;

an optical coupling structure bonded to the routing structure adjacent the electronic die, wherein the optical coupling structure comprises a first lens in a first side of a substrate, the optical coupling structure comprising a third side and a fourth side opposite the third side; and an encapsulant surrounding both the electronic die and the optical coupling structure, the encapsulant being a different material from the optical coupling structure, the encapsulant continuously extending from a first exterior surface to a second exterior surface, the first exterior surface being planar with the first side and the third side, the second exterior surface being planar with the second side and the fourth side.

2. The package of claim 1, wherein the routing structure further comprises a grating coupler optically coupled to the first waveguide, wherein the first lens is optically aligned to the grating coupler.

3. The package of claim 1, wherein top surfaces of the electronic die and the optical coupling structure are level.

4. The package of claim 1, wherein the optical coupling structure is laterally separated from the electronic die by the encapsulant.

5. The package of claim 1, wherein the optical coupling structure comprises an edge coupler and a mirror, wherein the mirror is configured to direct light into the edge coupler.

6. The package of claim 1, wherein the optical coupling structure comprises a second waveguide that is optically coupled to the first waveguide.

7. The package of claim 6, wherein the second waveguide overlies the first waveguide and is evanescently coupled to the first waveguide.

8. The package of claim 1, wherein the optical coupling structure further comprises a second lens in a second side of the substrate that is opposite the first side.

9. A package comprising:

an interposer comprising a plurality of conductive lines and a plurality of first waveguides;

an optical engine bonded to the interposer, wherein the optical engine comprises a first electronic die and a plurality of second waveguides, wherein at least one second waveguide is optically coupled to a respective first waveguide;

an optical coupling structure bonded to the interposer adjacent the optical engine, wherein the optical coupling structure comprises a first lens located adjacent to a first surface and comprises a first edge coupler that is optically coupled to a first waveguide of the interposer, the optical coupling structure comprising a first material; and an encapsulant surrounding the optical engine and the optical coupling structure, the encapsulant comprising a second material throughout the encapsulant, the second material being different from the first material, wherein a surface of the encapsulant furthest from the interposer shares a planar surface with the first surface.

10. The package of claim 9, wherein the first edge coupler is configured to receive light from an optical fiber attached to a sidewall of the optical coupling structure.

11. The package of claim 9, wherein the optical coupling structure comprises a first mirror adjacent the first edge coupler, wherein the first mirror is configured to receive light from above and redirect it into the first edge coupler.

12. The package of claim 11, wherein the optical coupling structure further comprises a second mirror and a second edge coupler, wherein the second mirror is configured to receive light from the second edge coupler and redirect it into the first mirror.

13. The package of claim 9, wherein the optical engine and the optical coupling structure are bonded to the interposer using dielectric-to-dielectric bonding.

14. The package of claim 9 further comprising a second electronic die bonded to the interposer.

15. The package of claim 9 further comprising a heat dissipation structure attached to the optical engine.

16. A method comprising:

forming a waveguide, a photonic component, and a grating coupler on a substrate, wherein the photonic component and the grating coupler are optically coupled to the waveguide;

forming a redistribution structure over the waveguide, the photonic component, and the grating coupler, wherein the redistribution structure is electrically coupled to the photonic component;

bonding an electronic die to the redistribution structure, wherein the electronic die is electrically coupled to the redistribution structure;

forming a dummy die separately from the redistribution structure;

after the forming the dummy die, placing the dummy die on the redistribution structure, wherein the dummy die comprises a lens, wherein placing the dummy die comprises aligning the lens to the grating coupler; and bonding the dummy die to the redistribution structure, wherein after the bonding the dummy die the lens is part of a first surface, a first portion of the first surface being planar with a surface of the electronic die.

17. The method of claim 16, further comprising attaching an optical fiber to the dummy die, wherein the optical fiber is optically coupled to the grating coupler through the lens.

18. The method of claim 17, wherein the optical fiber is attached to a top surface of the dummy die and directs light into the top surface.

19. The method of claim 17, wherein the optical fiber is attached to a sidewall surface of the dummy die and directs light into the sidewall surface.

20. The method of claim 16, further comprising attaching the redistribution structure to a package substrate.

* * * * *